(12) United States Patent
Kim et al.

(10) Patent No.: US 9,836,087 B2
(45) Date of Patent: Dec. 5, 2017

(54) FLEXIBLE DISPLAY

(71) Applicant: Samsung Display Co., Ltd., Yongin, Gyeonggi-do (KR)

(72) Inventors: Youn Joon Kim, Seoul (KR); Sangjo Lee, Hwaseong-si (KR); Junghun Lee, Hwaseong-si (KR); Jusuck Lee, Seoul (KR); Mi Jang, Suwon-si (KR); Kyungmin Choi, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/792,484

(22) Filed: Jul. 6, 2015

(65) Prior Publication Data
US 2016/0179141 A1 Jun. 23, 2016

(30) Foreign Application Priority Data
Dec. 22, 2014 (KR) .................. 10-2014-0186166

(51) Int. Cl.
*H05K 5/00* (2006.01)
*G06F 1/16* (2006.01)
*G09F 9/30* (2006.01)

(52) U.S. Cl.
CPC .......... *G06F 1/1652* (2013.01); *G06F 1/1679* (2013.01); *G09F 9/301* (2013.01)

(58) Field of Classification Search
CPC ...... G06F 1/162; G06F 1/1622; G06F 1/1649; G06F 1/1626; G06F 1/1654; G06F 1/1652; G06F 1/1679; G06F 1/181; G06F 2200/1638; H05K 7/20909; H05K 7/20963; H05K 7/20972; H05K 2201/05; H05K 1/0203; H05K 2201/066; H05K 7/205;
(Continued)

(56) References Cited

U.S. PATENT DOCUMENTS 6,762,929 B2 * 7/2004 Sawyer ................. G06F 1/1601
248/535
6,940,497 B2 * 9/2005 Vincent .................... G02F 1/15
345/204
(Continued)

FOREIGN PATENT DOCUMENTS

KR 10-0818170 B1 3/2008
KR 10-2009-0006606 A 1/2009
(Continued)

*Primary Examiner* — Pete Lee
(74) *Attorney, Agent, or Firm* — Knobbe Martens Olson & Bear LLP

(57) ABSTRACT

A flexible display is disclosed. In one aspect, the flexible display includes a flexible display panel and a housing for the flexible display. The flexible display panel is configured to be withdrawn from a surface of the housing. The flexible display also includes a grip connected to a first end of the flexible display panel and having a surface that opposes the surface of the housing in a first direction. The flexible display further a plurality of fixing members connected to one of the housing or the grip. The fixing members are configured to extend in a second direction crossing the first direction when the flexible display panel is accommodated in the housing and rotate in a predetermined direction so as to be substantially parallel to the first direction when the flexible display panel is withdrawn from the housing.

20 Claims, 23 Drawing Sheets

(58) Field of Classification Search
CPC ....... H05K 2201/10393; H05K 7/2039; H05K 7/20418; H05K 7/20427; H05K 2201/10681; H05K 1/0277; H05K 1/028; H05K 1/0283; H05K 1/147; H05K 1/189; H05K 2201/051; H05K 2201/053; H05K 2201/055; H05K 2201/056; H05K 2201/052; H01L 23/40; H01L 23/4006; G09F 9/301

See application file for complete search history.

(56) References Cited

U.S. PATENT DOCUMENTS

| | | | | |
|---|---|---|---|---|
| 7,559,163 | B2* | 7/2009 | Ofuji | G03B 21/58 160/265 |
| 7,639,237 | B2* | 12/2009 | Perkins | G06F 1/1615 345/156 |
| 7,710,370 | B2 | 5/2010 | Slikkerveer et al. | |
| 7,935,932 | B2* | 5/2011 | Kito | G03B 42/04 250/338.1 |
| 8,199,471 | B2* | 6/2012 | Bemelmans | G09F 9/00 345/690 |
| 8,289,232 | B2* | 10/2012 | Kobayashi | G09F 9/33 345/204 |
| 8,477,464 | B2 | 7/2013 | Visser et al. | |
| 8,908,365 | B2 | 12/2014 | Walters et al. | |
| 2002/0070910 | A1* | 6/2002 | Fujieda | G06F 1/1615 345/85 |
| 2006/0192726 | A1* | 8/2006 | Huitema | G06F 1/1601 345/1.1 |
| 2008/0144265 | A1* | 6/2008 | Aoki | G06F 1/1601 361/679.04 |
| 2008/0172197 | A1* | 7/2008 | Skipor | G03B 21/10 702/82 |
| 2008/0198541 | A1* | 8/2008 | Lin | G06F 1/1652 361/679.05 |

FOREIGN PATENT DOCUMENTS

| | | |
|---|---|---|
| KR | 10-2010-0017284 A | 2/2010 |
| KR | 10-2012-0014226 A | 2/2012 |
| KR | 10-1227644 B1 | 1/2013 |
| KR | 10-1417184 B1 | 7/2014 |
| WO | WO 2009/148313 A1 | 12/2009 |

\* cited by examiner

FLEXIBLE DISPLAY

CROSS-REFERENCE TO RELATED APPLICATION

This U.S. non-provisional patent application claims priority under 35 U.S.C. §119 of Korean Patent Application No. 10-2014-0186166, filed on Dec. 22, 2014, the contents of which are hereby incorporated by reference in its entirety.

BACKGROUND

Field

The present disclosure relates to a flexible display.

Description of the Related Technology

Ongoing research and development is being conducted into flexible displays since these displays are more convenient to use than traditional, fixed size displays. Various types of flexible displays have been developed, including curved displays having a specific curvature, foldable displays that can be bent to a specific radius of curvature or along a folding axis, and rollable displays that can be rolled to a specific radius of curvature.

Rollable displays have been singled out as a particularly attractive variety of flexible display since they have advantageous properties such as large display areas, superior mobility, etc.

SUMMARY OF CERTAIN INVENTIVE ASPECTS

One inventive aspect is a flexible display having an improved usability provided from a plurality of fixing members that maintain the display in a stable position when in use.

Another aspect is a flexible display including a display part having flexibility, an accommodating part, in which the display part is accommodated and from which the display part is withdrawn, a grip part connected to an end of the display part and arranged to face one side surface of the accommodating part in a first direction, and a plurality of fixing members connected to one side portion of the accommodating part or one side portion of the grip part, which faces the one side portion of the accommodating part. The fixing members extend in a second direction crossing the first direction and are rotated in a predetermined direction to be arranged substantially parallel to the first direction when the display part is withdrawn from the accommodating part.

One side portion of the display part in the first direction is connected to the accommodating part, the other side portion of the display part in the first direction is connected to the grip part, and the accommodating part and the grip part extend in the second direction.

The flexible display further includes a rotating part accommodated in the accommodating part. The display part is rolled around the rotating part along a predetermined rotating direction. The rotating member includes a rotating cylinder having a substantially cylindrical shape extending in the second direction and wrapping the display part on an outer surface thereof and a rotating shaft penetrating the rotating cylinder along the second direction, extending in the second direction, and including both ends fixed to an inner surface of the accommodating part in the second direction, and the rotating cylinder is rotated in a predetermined direction with respect to the rotating shaft.

The fixing members include first and second fixing members each having a substantially bar shape and first and second rotating members each being connected to one side portion of a corresponding fixing member of the first and second fixing members in the second direction. The first and second fixing members are rotated with respect to the first and second rotating members, respectively, and the first and second fixing members are arranged substantially parallel to the first direction due to the rotation of the first and second fixing members.

The first and second fixing members are accommodated in the accommodating part, the first rotating member is arranged at one side portion of an inner surface of the accommodating part in the second direction, the second rotating member is arranged at the other side portion of the inner surface of the accommodating part in the second direction, one side portion of the first fixing member in the second direction is connected to the first rotating member, the other side portion of the first fixing member in the second direction is arranged adjacent to the second rotating member, one side portion of the second fixing member in the second direction is connected to the second rotating member, and the other side portion of the second fixing member in the second direction is arranged adjacent to the first rotating member.

The first fixing member is rotated in a clockwise direction and the second fixing member is rotated in a counter-clockwise direction.

The accommodating part includes an opening portion formed through a side surface of the accommodating part, which faces the grip part in the first direction, and the display part, the first fixing member, and the second fixing member are accommodated in and withdrawn from the accommodating part through the opening portion.

The grip part includes a connection portion connected to an end of the display part and first and second recesses arranged adjacent to the connection portion, the first fixing member is rotated to be engaged with the first recess, and the second fixing member is rotated to be engaged with the second recess.

The opening portion includes a first opening portion through which the display part is accommodated in and withdrawn from the accommodating part and a second opening portion through which the first and second fixing members are accommodated in and withdrawn from the accommodating part.

The first fixing member is arranged above the second fixing member.

The first and second fixing members are arranged in substantially the same horizontal plane, the second fixing member is arranged at one side portion of the first fixing member in the first direction, and the length of the second fixing member in a longitudinal direction is longer than the length of the first fixing member in a longitudinal direction.

The accommodating part includes an opening portion formed through a side surface of the accommodating part, which faces the grip part in the first direction, the grip part includes a sub-accommodating part formed through one side surface of the grip part, which faces the accommodating part in the first direction, the first and second fixing members are accommodated in the grip part, the display part is accommodated in and withdrawn from the accommodating part through the opening portion, and the first and second fixing members are accommodated in and withdrawn from the grip part through the sub-accommodating part.

The first rotating member is arranged at one side portion of an inner surface of the grip part in the second direction, the second rotating member is arranged at the other side portion of the inner surface of the grip part in the second direction, one side portion of the first fixing member in the second direction is connected to the first rotating member, the other side portion of the first fixing member in the second direction is arranged adjacent to the second rotating member, one side portion of the second fixing member in the second direction is connected to the second rotating member, and the other side portion of the second fixing member in the second direction is arranged adjacent to the first rotating member.

The first fixing member is arranged above the second fixing member in the grip part to be substantially parallel to the second direction.

The sub-accommodating part includes a first sub-accommodating part, through which the first fixing member is accommodated in and withdrawn from the grip part, and a second sub-accommodating part arranged under the first sub-accommodating part, through which the second fixing member is accommodated in and withdrawn from the grip part.

The first and second fixing members are arranged in substantially the same horizontal plane surface, the second fixing member is arranged at the other side portion of the first fixing member in the first direction, and the length of the second fixing member in a longitudinal direction is longer than the length of the first fixing member in a longitudinal direction.

The fixing members further include third and fourth fixing members each having a substantially bar shape and third and fourth rotating members each being connected to an end of a corresponding fixing member of the third and fourth fixing members. The first and second fixing members and the first and second rotating members are accommodated in the accommodating part, the third and fourth fixing members and the third and fourth rotating members are accommodated in the grip part, each of the third and fourth fixing members is rotated with respect to a corresponding rotating member of the third and fourth rotating members, and the third and fourth fixing members are arranged substantially parallel to the first direction due to the rotation of the third and fourth rotating members.

The accommodating part includes an opening portion formed through a side surface of the accommodating part, which faces the grip part in the first direction, the grip part includes a sub-accommodating part formed through a side surface of the grip part, which faces the accommodating part in the first direction, the first and second fixing members are rotated to be accommodated in and withdrawn from the accommodating part through the opening portion, and the third and fourth fixing members are rotated to be accommodated in and withdrawn from the grip part through the sub-accommodating part The first rotating member is arranged at one side portion of an inner surface of the accommodating part in the second direction, the second rotating member is arranged at the other side portion of the inner surface of the accommodating part in the second direction, one side portion of the first fixing member in the second direction is connected to the first rotating member, one side portion of the second fixing member in the second direction is connected to the second rotating member, the third rotating member is arranged at one side portion of an inner surface of the grip part in the second direction, the fourth rotating member is arranged at the other side portion of the inner surface of the grip part in the second direction, one side portion of the third fixing member in the second direction is connected to the third rotating member, and one side portion of the fourth fixing member in the second direction is connected to the fourth rotating member.

The other side portion in the second direction of the first fixing member is rotated in the clockwise direction, the other side portion of the third fixing member in the second direction is rotated in the counter-clockwise direction, the other side surface of the first fixing member in the second direction makes contact with the other side surface of the third fixing member in the second direction, the first and third fixing members are connected to each other such that a longitudinal direction of the first and third fixing members is arranged in the first direction, the other side portion of the second fixing member in the second direction is rotated in the counter-clockwise direction, the other side portion of the fourth fixing member in the second direction is rotated in the clockwise direction, the other side surface of the second fixing member in the second direction makes contact with the other side surface in the second direction of the fourth fixing member, and the second and fourth fixing members are connected to each other such that a longitudinal direction of the second and fourth fixing members is arranged in the first direction.

Another aspect is a flexible display comprising a flexible display panel; a housing for the flexible display, wherein the flexible display panel is configured to be withdrawn from a surface of the housing; a grip connected to a first end of the flexible display panel and having a surface that opposes the surface of the housing in a first direction; and a plurality of fixing members connected to one of the housing or the grip, wherein the fixing members are configured to: i) extend in a second direction crossing the first direction when the flexible display panel is accommodated in the housing and ii) rotate in a predetermined direction so as to be substantially parallel to the first direction when the flexible display panel is withdrawn from the housing.

In exemplary embodiments, a second end of the flexible display panel opposing the first end in the first direction is connected to the housing and wherein the housing and the grip each have a length extending in the second direction.

In exemplary embodiments, the flexible display further comprises a rotating part housed in the housing, wherein the flexible display panel is configured to be rolled around the rotating part in a predetermined rotating direction, and wherein the rotating part comprises a rotating cylinder having a substantially cylindrical shape extending in the second direction, wherein the flexible display panel is configured to be wrapped around an outer surface of the rotating cylinder; and a rotating shaft penetrating the rotating cylinder in the second direction and extending in the second direction, wherein opposing ends of the rotating shaft protrude from ends of the rotating cylinder, wherein the opposing ends of the rotating shaft are connected to an inner surface of the housing in the second direction, and wherein the rotating cylinder is configured to rotate around the rotating shaft.

In exemplary embodiments, the fixing members comprise first and second fixing members each having a substantially bar shape; and first and second rotating members each being respectively connected to first ends of the first and second fixing members, wherein the first and second fixing members are configured to respectively rotate with respect to the first and second rotating members, and wherein the first and second fixing members are configured to be arranged to be substantially parallel to the first direction when the flexible display panel is withdrawn from the housing.

In exemplary embodiments, the first and second fixing members are configured to be housed in the housing, wherein the first rotating member is arranged at a first side of an inner surface of the housing, wherein the second rotating member is arranged at a second side of the inner surface of the housing opposing the first side in the second direction, wherein a second end of the first fixing member opposing the first end is arranged adjacent to the second rotating member when the flexible display panel is accommodated in the housing, and wherein a second end of the second fixing member opposing the first end is arranged adjacent to the first rotating member when the flexible display panel is accommodated in the housing.

In exemplary embodiments, the first fixing member is configured to rotate in a clockwise direction and the second fixing member is configured to rotate in a counter-clockwise direction when the flexible display panel is withdrawn from the housing.

In exemplary embodiments, the housing comprises an opening defined in the surface thereof, and wherein the flexible display panel, the first fixing member, and the second fixing member are configured to be accommodated in and withdrawn from the housing through the opening.

In exemplary embodiments, the grip part comprises a connection portion connected to the flexible display panel; and first and second recesses formed adjacent to the connection portion, wherein the first fixing member is configured to be engaged with the first recess, and wherein the second fixing member is configured to be engaged with the second recess.

In exemplary embodiments, the opening comprises a first opening through which the flexible display panel is configured to be retracted into and withdrawn from the housing; and a second opening through which the first and second fixing members are configured to be retracted into and withdrawn from the housing.

In exemplary embodiments, the first fixing member is arranged above the second fixing member.

In exemplary embodiments, the first and second fixing members are arranged in substantially the same horizontal plane, wherein the second rotating member is arranged further from the opening than the first rotating member in the first direction, and wherein the length of the second fixing member is greater than the length of the first fixing member.

In exemplary embodiments, the housing comprises a first opening defined in the surface of the housing, wherein the grip comprises a sub-housing defined in the surface of the grip, wherein the first and second fixing members are configured to be housed in the sub-housing, wherein the flexible display panel is configured to be retracted into and withdrawn from the housing through the first opening, and wherein the first and second fixing members are configured to be retracted into and withdrawn from the grip through a second opening defined in the sub-housing.

In exemplary embodiments, the first rotating member is arranged at a first side of an inner surface of the grip, wherein the second rotating member is arranged at a second side of the inner surface of the grip opposing the first side in the second direction, wherein a second end of the first fixing member opposing the first end is arranged adjacent to the second rotating member, and wherein a second end of the second fixing member opposing the first end is arranged adjacent to the first rotating member.

In exemplary embodiments, the first fixing member is arranged above the second fixing member in the grip so as to be substantially parallel to the second direction when the flexible display is accommodated in the housing.

In exemplary embodiments, the second opening in the sub-housing comprises a third opening through which the first fixing member is configured to be retracted into and withdrawn from the grip; and a fourth opening arranged under the third opening and through which the second fixing member is configured to be retracted into and withdrawn from the grip.

In exemplary embodiments, the first and second fixing members are arranged in substantially the same horizontal plane surface, wherein the second rotating member is arranged further from the second opening than the first rotating member in the first direction, and wherein the length the second fixing member is greater than the length of the first fixing member.

In exemplary embodiments, the fixing members further comprise third and fourth fixing members each having a substantially bar shape; and third and fourth rotating members each being respectively connected to first ends of the third and fourth fixing members, wherein the first and second fixing members and the first and second rotating members are configured to be accommodated in the housing, wherein the third and fourth fixing members and the third and fourth rotating members are configured to be accommodated in the grip part, wherein each of the third and fourth fixing members is configured to respectively rotate with respect to the third and fourth rotating members, and wherein the third and fourth fixing members are configured to be arranged substantially parallel to the first direction when the flexible display is withdrawn from the housing.

In exemplary embodiments, the housing comprises a first opening defined in the surface of the housing, wherein the grip comprises a second opening defined in the surface of the grip, wherein the first and second fixing members are configured to be retracted into and withdrawn from the housing through the first opening, and wherein the third and fourth fixing members are configured to be retracted into and withdrawn from the grip through the second opening.

In exemplary embodiments, the first rotating member is arranged at a first side of the housing, wherein the second rotating member is arranged at a second side of the housing opposing the first side in the second direction, wherein the third rotating member is arranged at a first side of the grip, and wherein the fourth rotating member is arranged at a second side of the grip opposing the first side in the second direction.

In exemplary embodiments, a second end of the first fixing member opposing the first end is configured to rotate in the clockwise direction, wherein a second end of the third fixing member opposing the first end is configured to rotate in the counter-clockwise direction, wherein the second end of the first fixing member is configured to contact the second end of the third fixing member, wherein the first and third fixing members are configured to connect to each other such that a longitudinal direction of each of the first and third fixing members is arranged in the first direction, wherein a second end of the second fixing member opposing the first end is configured to rotate in the counter-clockwise direction, wherein a second end of the fourth fixing member opposing the first end is configured to rotate in the clockwise direction, wherein the second end of the second fixing member is configured to contact the second end of the fourth fixing member, and wherein the second and fourth fixing members are configured to connect to each other such that a longitudinal direction of the second and fourth fixing members is arranged in the first direction.

According to at least one embodiment, the flexible display has an improved usability provided from a plurality of fixing members that maintain the display in a stable position when in use.

BRIEF DESCRIPTION OF THE DRAWINGS

The above and other advantages will become readily apparent by reference to the following detailed description when considered in conjunction with the accompanying drawings wherein.

DETAILED DESCRIPTION OF CERTAIN INVENTIVE EMBODIMENTS

Figure 1:
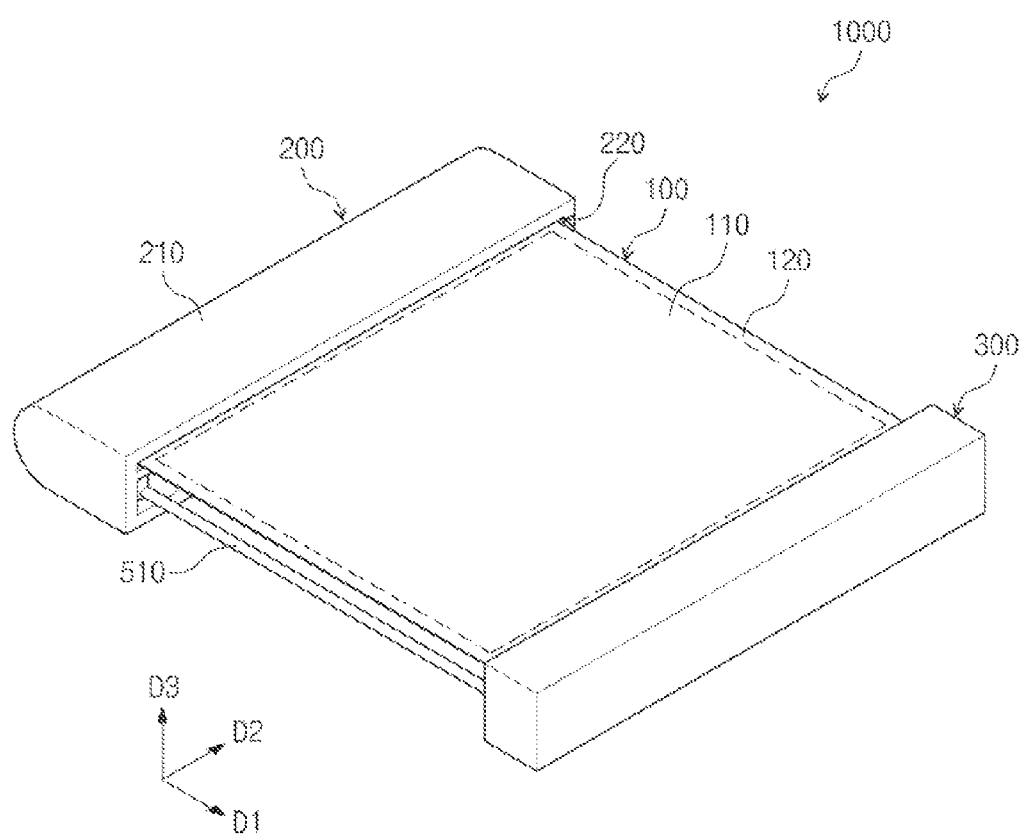
FIG. 1 is a perspective view showing a flexible display according to a first exemplary embodiment of the present disclosure.

It will be understood that when an element or layer is referred to as being "on", "connected to" or "coupled to" another element or layer, it can be directly on, connected or coupled to the other element or layer or intervening elements or layers may also be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation(s) depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein are to be interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings.

Figure 2:
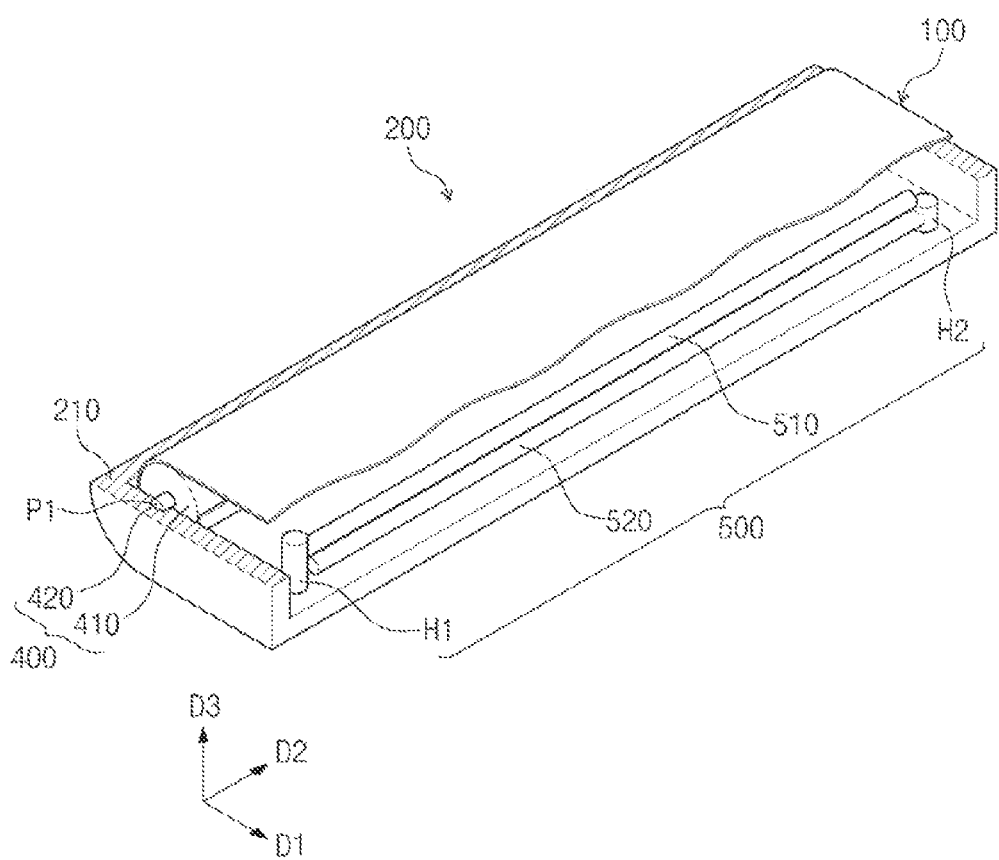
FIG. 2 is a perspective view showing the accommodating member shown in FIG. 1.

FIG. 1 is a perspective view showing a flexible display according to a first exemplary embodiment of the present disclosure. FIG. 2 is a perspective view showing an accommodating member shown in FIG. 1.

Referring to FIGS. 1 and 2, the flexible display 1000 includes a display part or display panel 100, an accommodating part or housing 200, a grip part or grip 300, a rotating part 400, and a fixing part 500.

The display part 100 has a substantially quadrangular shape. The display part 100 is flexible, and thus, the display part 100 can be rolled and unrolled. That is, the display part 100 is a flexible display part.

One end of the display part 100 in a first direction D1 is connected to the accommodating part 200 and the other end of the display part 100 in the first direction D1 is connected to the grip part 300.

When a user pulls the grip part 300 in the first direction D1, the display part 100 accommodated in the accommodating part 200 is unrolled and withdrawn from the accommodating part 200. That is, the display part 100 can be rolled to be accommodated in the accommodating part 200 and unrolled in the opposite direction to be withdrawn from the accommodating part 200.

The display part 100 includes an image display part or display area 110 and an insulating substrate 120. The image display part 110 generates or emits light to display an image. The image display part 110 can include various display devices that can be implemented as a flexible display.

The image display part 110 is formed on the insulating substrate 120. The insulating substrate 120 includes a transparent material and is flexible. As an example, the insulating substrate 120 includes polyimide.

The accommodating part 200 has short sides extending in the first direction D1 and long sides extending in a second direction D2 substantially perpendicular to the first direction D1. The accommodating part 200 accommodates the display part 100, the rotating part 400, and the fixing part 500 therein.

The accommodating part 200 includes a housing body 210 and an opening portion or opening 220 formed through the housing body 210.

The opening portion 220 is formed in a side surface of the accommodating part 200 which faces the grip part 300 in the first direction D1. The display part 100 and the fixing part 500 are accommodated in and are withdrawn from the accommodating part 200 through the opening portion 220. The shape of the opening portion 220 will be described in detail with reference to FIGS. 3A to 3C.

The length of the grip part 300 in the second direction D2 is greater than the length of the opening portion 220 in the second direction D2. In addition, the length of the grip part 300 in a third direction D3 is longer than the width of the opening portion 220 in the third direction D3. The third direction D3 is substantially perpendicular to each of the first and second directions D1 and D2. Accordingly, when the display part 100 is accommodated in the accommodating part 200, the grip part 300 is not accommodated in the accommodating part 200. That is, when the display part 100 is accommodated in the accommodating part 200, one side surface of the grip part 300 contacts the side surface of the accommodating part 200 in which the opening portion 220 is formed.

The rotating part 400 includes a rotating cylinder 410 and a rotating shaft 420. The rotating cylinder 410 has a substantially cylindrical shape extending in the second direction D2. The display part 100 is rolled on the outer surface of the rotating cylinder 410. In other words, the rotating cylinder 410 can act as a winding core of the display part 100.

The rotating shaft 420 is formed at a center portion of the rotating cylinder 410. In detail, the rotating shaft 420 is formed to penetrate through the rotating cylinder 410 along the second direction D2. The rotating shaft 420 extends in the second direction D2 and both ends of the rotating shaft 420 are connected to two inner surfaces of the accommodating part 200 in the second direction D2. In some embodiments, the rotating shaft 420 is formed as a pair of protrusions on opposing sides of the rotating cylinder 410 that are formed along a rotation axis of the rotating cylinder 410.

The inner surfaces of the accommodating part 200 include first and second engraved portions P1 and P2 arranged in the second direction D2. In detail, the first engraved portion P1 is formed in one inner surface corresponding to one end of the accommodating part 200 in the second direction D2 and the second engraved portion P2 is formed at an opposing inner surface corresponding to the other end of the accommodating part 200 in the second direction D2.

Both ends of the rotating shaft 420 are respectively placed in the first and second engraved portions P1 and P2. In detail, one end of the rotating shaft 420 in the second direction D2 is arranged in the first engraved portion P1 and the other end of the rotating shaft 420 in the second direction D2 is arranged in the second engraved portion P2. Therefore, the rotating cylinder 410 rotates with respect to the rotating shaft 420 fixed to the accommodating part 200 to allow the display part 100 to be rolled onto the rotating cylinder 410.

Although not shown in figures, the rotating cylinder 410 can include a circuit board, a flexible circuit board, and a driving integrated circuit (IC). The circuit board, the flexible circuit board, and the driving IC can be formed on an inner circumference surface of the rotating cylinder 410. The driving IC can be mounted on the flexible circuit board. The circuit board can be connected to the display part 100 by the flexible circuit board. The circuit board outputs an image signal and the image signal can be applied to the driving IC. The driving IC converts the image signal to a driving signal to drive the display part 100 and applies the driving signal to the display part 100.

The fixing part 500 includes a first fixing member 510, a second fixing member 520, a first rotating member H1, and a second rotating member H2. The fixing part 500 is accommodated in the accommodating part 200. In detail, the fixing part 500 is accommodated in the accommodating part 200 and formed adjacent to the opening portion 200 in the first direction D1.

Each of the first and second fixing members 510 and 520 has a substantially bar or rod shape and can extend in the second direction D2. The first and second fixing members 510 and 520 have a substantially circular or polygonal shape when viewed in a cross-sectional view. FIG. 2 shows the circular cross-sectional shape of the first and second fixing members 510 and 520 as a representative example.

The first and second rotating members H1 and H2 are arranged on the inner surface of the accommodating part 200. In detail, the first rotating member H1 is formed at one side portion of the accommodating part 200 in the second direction D2 and the second rotating member H2 is formed at an opposing side portion of the accommodating part 200 in the second direction D2. As an example, each of the first and second rotating members H1 and H2 can be formed as a hinge.

The first rotating member H1 is connected to one side portion of the first fixing member 510 in the second direction D2 and the second rotating member H2 is connected to the opposing side portion of the second fixing member 520 in the second direction D2.

In detail, the one side portion of the first fixing member 510 in the second direction D2 is connected to the first rotating member H1 and fixed to the accommodating part 200 and the other side portion of the first fixing member 510 in the second direction D2 is arranged adjacent to the second rotating member H2. In addition, the one side portion of the second fixing member 520 in the second direction D2 is connected to the second rotating member H2 and fixed to the accommodating part 200 and the other side portion of the second fixing member 520 in the second direction D2 is arranged adjacent to the first rotating member H1.

In the FIG. 2 embodiment, the first fixing member 510 is arranged at a position higher than the second fixing member 520. That is, the first and second fixing members 510 and 520 are arranged to be substantially parallel to the second direction D2.

The first and second rotating members H1 and H2 are configured to be rotated. In detail, the first and second rotating members H1 and H2 can rotate the first and second fixing members 510 and 520, which extend in the second direction D2, in the first direction D1 toward the grip part 300.

The first and second fixing members 510 and 520 can be respectively rotated by the first and second members H1 and H2 so as to be withdrawn from the accommodating part 200. The rotation of the fixing part 500 will be described in detail with reference to FIGS. 5A and 5B.

Figure 3A:
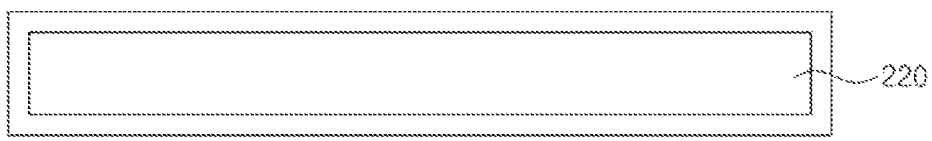
FIGS. 3A to 3C are views showing the shapes of the opening portion according to the first exemplary embodiment of the present disclosure.
Figure 3B:
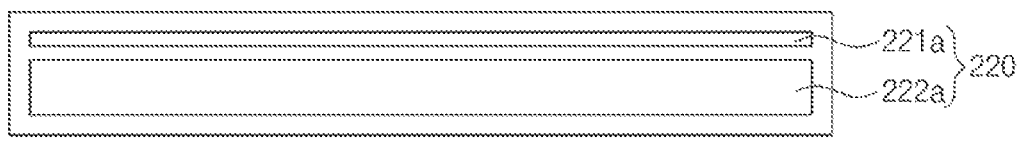
Figure 3C:
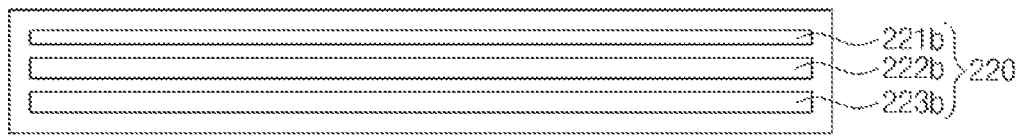

FIGS. 3A to 3C views showing the shapes of the opening portion according to the first exemplary embodiment of the present disclosure.

Referring to the embodiment of FIG. 3A, the opening portion 220 has a substantially bar shape or a substantially rectangular shape extending in the second direction D2. The length of the opening portion 220 in the second direction D2 is greater than or substantially equal to that of each of the display part 110, the first fixing member 510, and the second fixing member 520. Accordingly, the display part 110, the first fixing member 510, and the second fixing member 520 are accommodated in and withdrawn from the accommodating part 200 through the opening portion 220.

Referring to FIG. 3B, the opening portion 220 can include a first opening portion 221a and a second opening portion 222a. The first opening portion 221a is formed over the second opening portion 222a.

The display part 100 can be accommodated in and withdrawn from the accommodating part 200 through the first opening portion 221a.

The first and second fixing members 510 and 520 can be accommodated in and withdrawn from the accommodating part 200 through the second opening portion 222a.

Referring to FIG. 3C, the opening portion 220 can include a first opening portion 221b, a second opening portion 222b, and a third opening portion 223b. The first opening portion 221b is formed over the second opening portion 222b and the second opening portion 222b is formed over the third opening portion 223b.

The display part 100 can be accommodated in and withdrawn from the accommodating part 200 through the first opening portion 221b.

The first fixing member 510 can be accommodated in and withdrawn from the accommodating part 200 through the second opening portion 222b.

The second fixing member 520 can be accommodated in and withdrawn from the accommodating part 200 through the third opening portion 223b.

Figure 4:
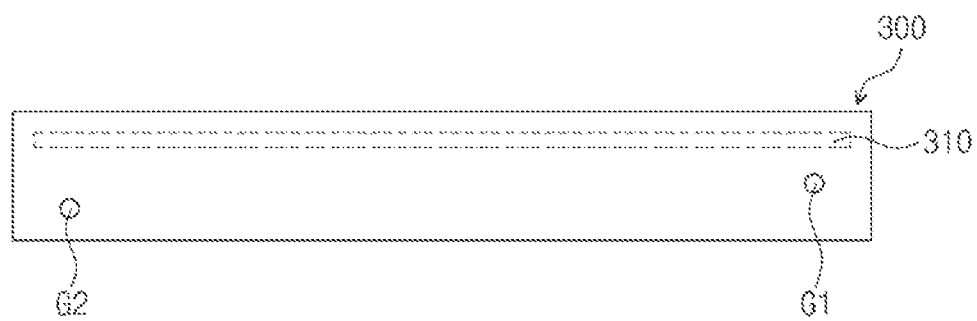
FIG. 4 is a side surface view showing one side surface of the grip part according to the first exemplary embodiment of the present disclosure.

FIG. 4 is a side surface view showing one side surface of the grip part according to the first exemplary embodiment of the present disclosure. In detail, FIG. 4 shows the one side surface of the grip part when viewed in the first direction D1.

Referring to FIG. 4, the grip part 300 includes a connection portion 310, a first recess G1, and a second recess G2.

The connection portion 310 is arranged on the one side surface of the grip part 300 in the first direction D1. The display part 100 is connected to the grip part 300 by the connection portion 310.

The first recess G1 is formed under the connection portion 310. The first recess G1 is arranged at one side surface of the grip part 300 in the first direction D1 and arranged at one side of the grip part 300 in the second direction D2.

The second recess G2 is formed under the first recess G1 when viewed from a horizontal plane surface. In addition, the second recess G2 is arranged at the one side surface of the grip part 300 in the first direction D1 and at an opposing side surface of the grip part 300 in the second direction D2 with respect to the first recess G1.

Figure 5A:
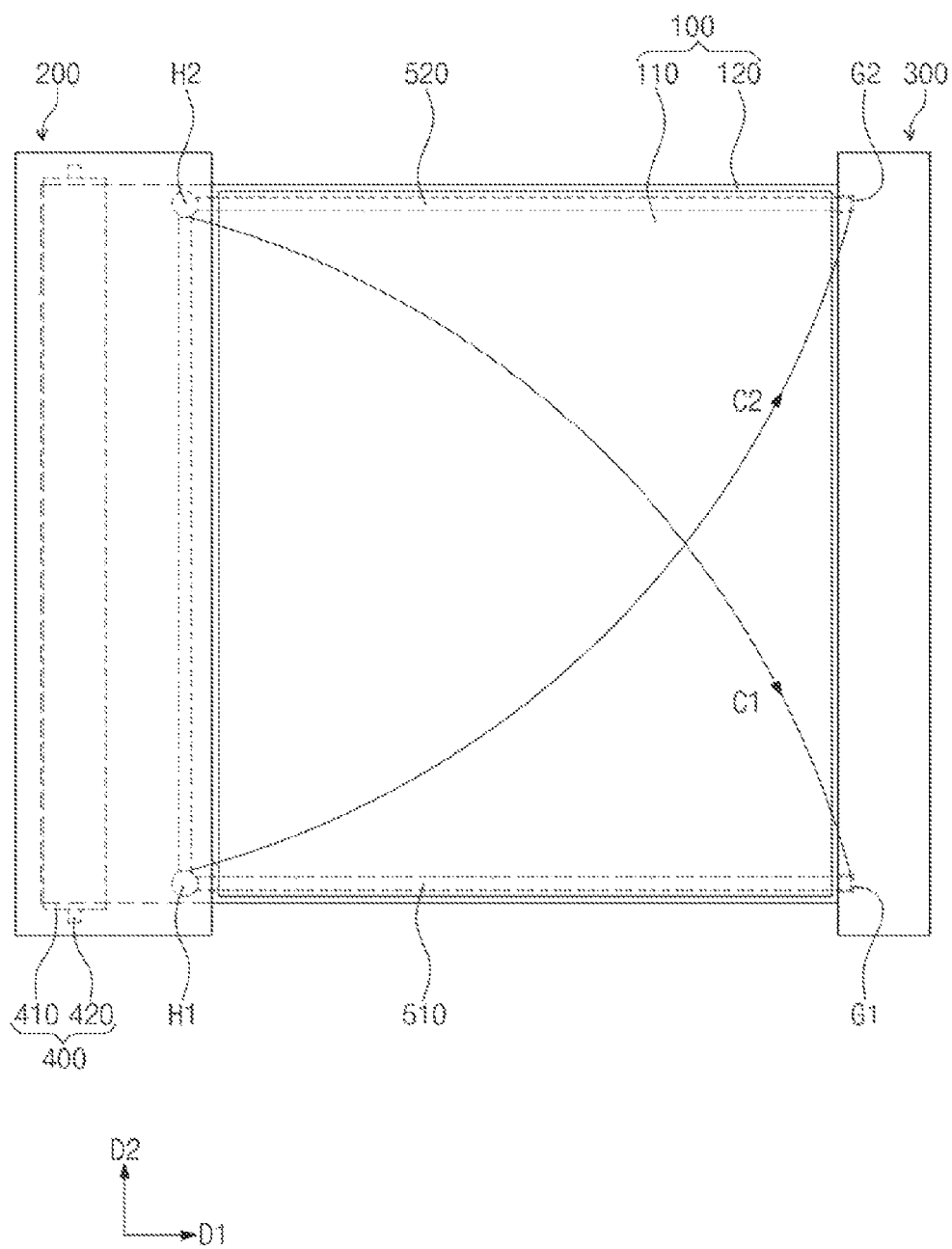
FIG. 5A is a plan view showing the flexible display according to the first exemplary embodiment of the present disclosure.
Figure 5B:
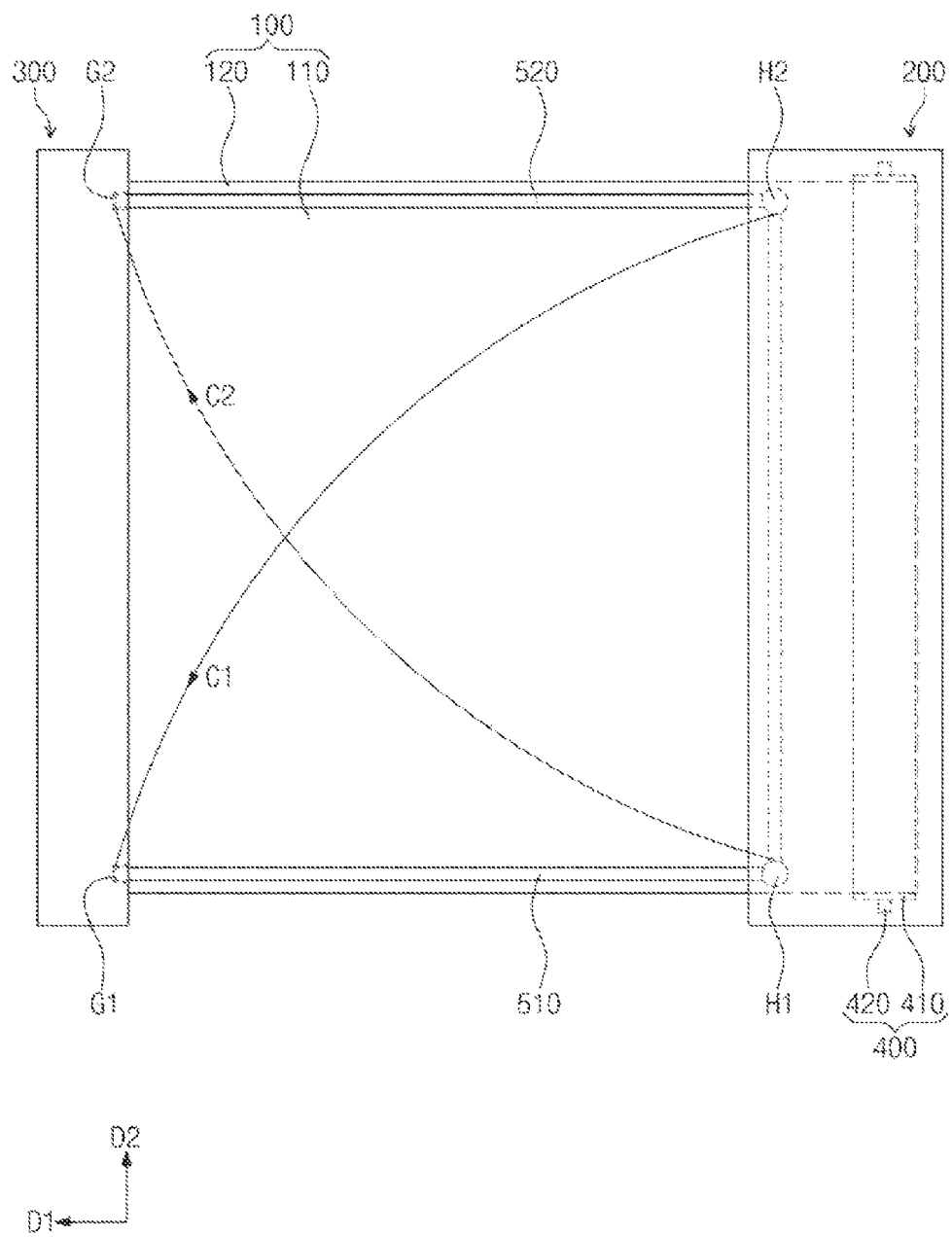
FIG. 5B is a rear view showing the flexible display according to the first exemplary embodiment of the present disclosure.

FIG. 5A is a plan view showing the flexible display according to the first exemplary embodiment of the present disclosure. FIG. 5B is a rear view showing the flexible display according to the first exemplary embodiment of the present disclosure.

Referring to FIGS. 5A and 5B, the first and second fixing members 510 and 520 can be respectively rotated via the first and second rotating members H1 and H2. That is, the first and second fixing members 510 and 520 extending in the second direction D2 can be rotated such that the longitudinal direction of each of the first and second fixing members 510 and 520 is rotated to extend the first direction D1.

The first fixing member 510 can be rotated in a clockwise direction C1 with respect to the first rotating member H1 and the second fixing member 520 can rotated in a counterclockwise direction C2 with respect to the second rotating member H2 when viewed in the plan view.

The first and second fixing members 510 and 520 are withdrawn from the accommodating part 200 through the opening portion 220 when respectively rotated in the clockwise direction C1 and the counter-clockwise direction C2.

Since the one side portion of the first fixing member 510 is fixed to the first rotating member H1 and the other side portion of the first fixing member 510 can be rotated in the clockwise direction C1, the other side portion of the first fixing member 510 can contact the grip part 300.

Since the one side portion of the second fixing member 520 is fixed to the second rotating member H2 and the other side portion of the second fixing member 520 can be rotated in the counter-clockwise direction C2, the other side portion of the second fixing member 520 can contact the grip part 300. Therefore, the first and second fixing members 510 and 520 can be placed to allow a longitudinal direction of each of the first and second fixing members 510 and 520 to be substantially parallel to the first direction D1.

The other side portion of the first fixing member 510 is inserted into the first recess G1 and the other side portion of the second fixing member 520 is inserted into the second recess G2. Thus, the first fixing member 510 is held by the first recess G1 and the second fixing member 520 is held by the second recess G2.

The display part 100 can be rolled in the direction of the accommodating part 200, which is opposite to the first direction D1, after being unrolled in the first direction D1. The fixing part 500 prevents the display part 100 from being rolled in the direction of the accommodating part 200.

Consequently, the flexible display 1000 can hold the display part 100 such that the display part 100 is not rolled in the direction of the accommodating part 200 when the display part 100 is on and in use.

Figure 6:
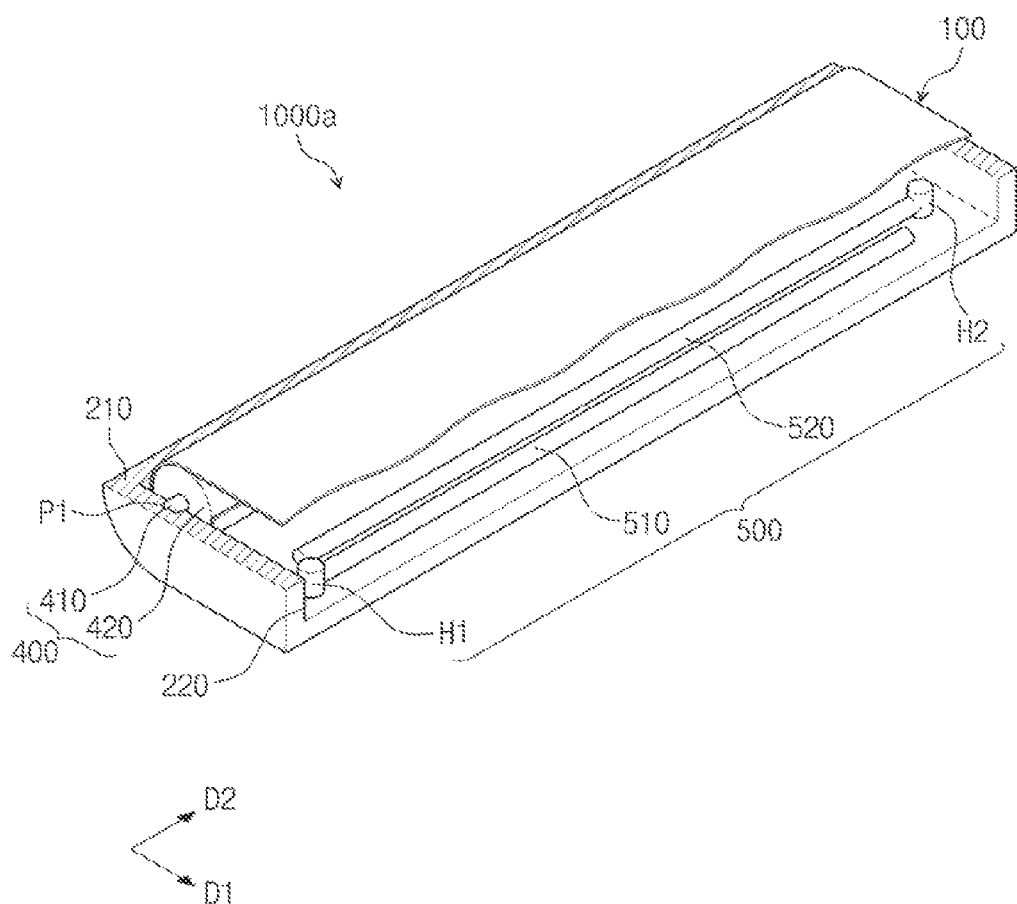
FIG. 6 is perspective view showing an accommodating member according to a second exemplary embodiment of the present disclosure.

FIG. 6 is perspective view showing an accommodating member according to a second exemplary embodiment of the present disclosure.

In the present exemplary embodiment, the flexible display 1000a has substantially the same structure and function as that of the flexible display 1000 shown in FIGS. 1 to 5B except for an opening portion 220, a grip part 300, and a fixing member 500. Accordingly, detailed descriptions of the elements included in the flexible display 1000a will be omitted except for the opening portion 220, the grip part 300, and the fixing member 500.

Referring to FIG. 6, the fixing part 500 includes a first fixing member 510, a second fixing member 520, a first rotating member H1, and a second rotating member H2. The fixing part 500 can be accommodated in the accommodating part 200. The fixing part 500 can be accommodated in the accommodating part 200 in the first direction D1 and arranged adjacent to the opening portion 220.

The first and second rotating members H1 and H2 are arranged on the inner surface of the accommodating part 200. In detail, the first rotating member H1 is arranged at one side portion of the accommodating part 200 in the second direction D2 and the second rotating member H2 is arranged at the opposing side portion of the accommodating part 200 in the second direction D2.

The first rotating member H1 is connected to one side portion of the first fixing member 510 in the second direction D2 and the second rotating member H2 is connected to the one side portion of the second fixing member 520 in the second direction D2.

In detail, the one side portion of the first fixing member 510 in the second direction D2 is connected to the first rotating member H1 and fixed to the accommodating part 200 and the other side portion of the first fixing member 510 in the second direction D2 is arranged adjacent to the second rotating member H2. In addition, the one side portion of the second fixing member 520 in the second direction D2 is connected to the second rotating member H2 and fixed to the accommodating part 200 and the other side portion of the second fixing member 520 in the second direction D2 is arranged adjacent to the first rotating member H1.

The first and second fixing members 510 and 520 are arranged in substantially the same plane surface. The second fixing member 520 is arranged at the one side portion of the first fixing member 510 in the first direction D1 and the second rotating member H2 is arranged at the one side portion of the first rotating member H1 in the first direction D1. That is, the second fixing member 520 and the second rotating member H2 are arranged closer to the one side portion of the accommodating part 200 in the first direction D1 than the first fixing member 510 and the first rotating member H1.

The length of the first fixing member 510 in the second direction D2 is less than the length of the second fixing member 520 in the second direction D2. The difference in the lengths between the first and second fixing members 510 and 520 in the second direction D2 corresponds to the distance between the first and second fixing members 510 and 520 in the first direction D1.

Figure 7A:
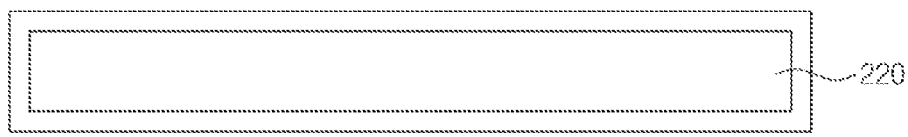
FIGS. 7A and 7B are views showing shapes of an opening portion according to the second exemplary embodiment of the present disclosure.
Figure 7B:
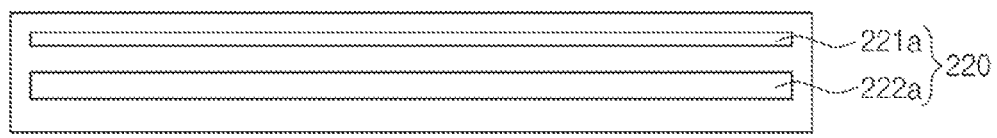

FIGS. 7A and 7B are views showing the shapes of the opening portion according to the second exemplary embodiment of the present disclosure.

Referring to FIG. 7A, the opening portion 220 has a substantially bar shape extending in the second direction D2. The length of the opening portion 220 in the second direction D2 is greater than or substantially equal to the lengths of each of the display part 100, the first fixing member 510, and the second fixing member 520 in the second direction D2. Accordingly, the display part 100, the first fixing member 510, and the second fixing member 520 can be accommodated in and withdrawn from the accommodating part 200 through the opening portion 220.

Referring to FIG. 7B, the opening portion 220 includes a first opening portion 221a and a second opening portion 222a. The first opening portion 221a is formed above the second opening portion 222a.

The display part 100 can be accommodated in and withdrawn from the accommodating part 200 through the first opening portion 221a.

The first and second fixing members 510 and 520 can be accommodated in and withdrawn from the accommodating part 200 through the second opening portion 222a.

Figure 8:
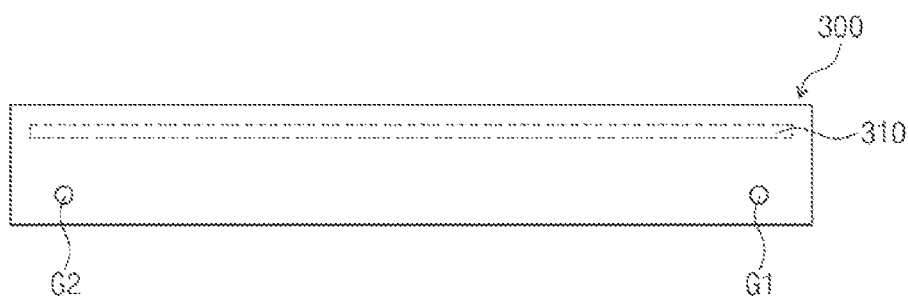
FIG. 8 is a side surface view showing one side surface of the grip part according to the second exemplary embodiment of the present disclosure.

FIG. 8 is a side surface view showing one side surface of the grip part according to the second exemplary embodiment of the present disclosure.

Referring to FIG. 8, the grip part 300 includes a connection portion 310, a first recess G1, and a second recess G2.

The connection portion 310 is arranged on the one side surface of the grip part 300 in the first direction D1. The display part 100 is connected to the grip part 300 by the connection portion 310.

The first recess G1 is formed under the connection portion 310 and the first and second recesses G1 and G2 are formed in substantially the same plane surface. In detail, the first recess G1 is arranged at one side surface of the grip part 300 in the first direction D1 and arranged at one side of the grip part 300 in the second direction D2. The second recess G2 is arranged at the one side surface of the grip part 300 in the first direction D1 and at an opposing side surface of the grip part 300 in the second direction D2 with respect to the first recess G1.

Figure 9A:
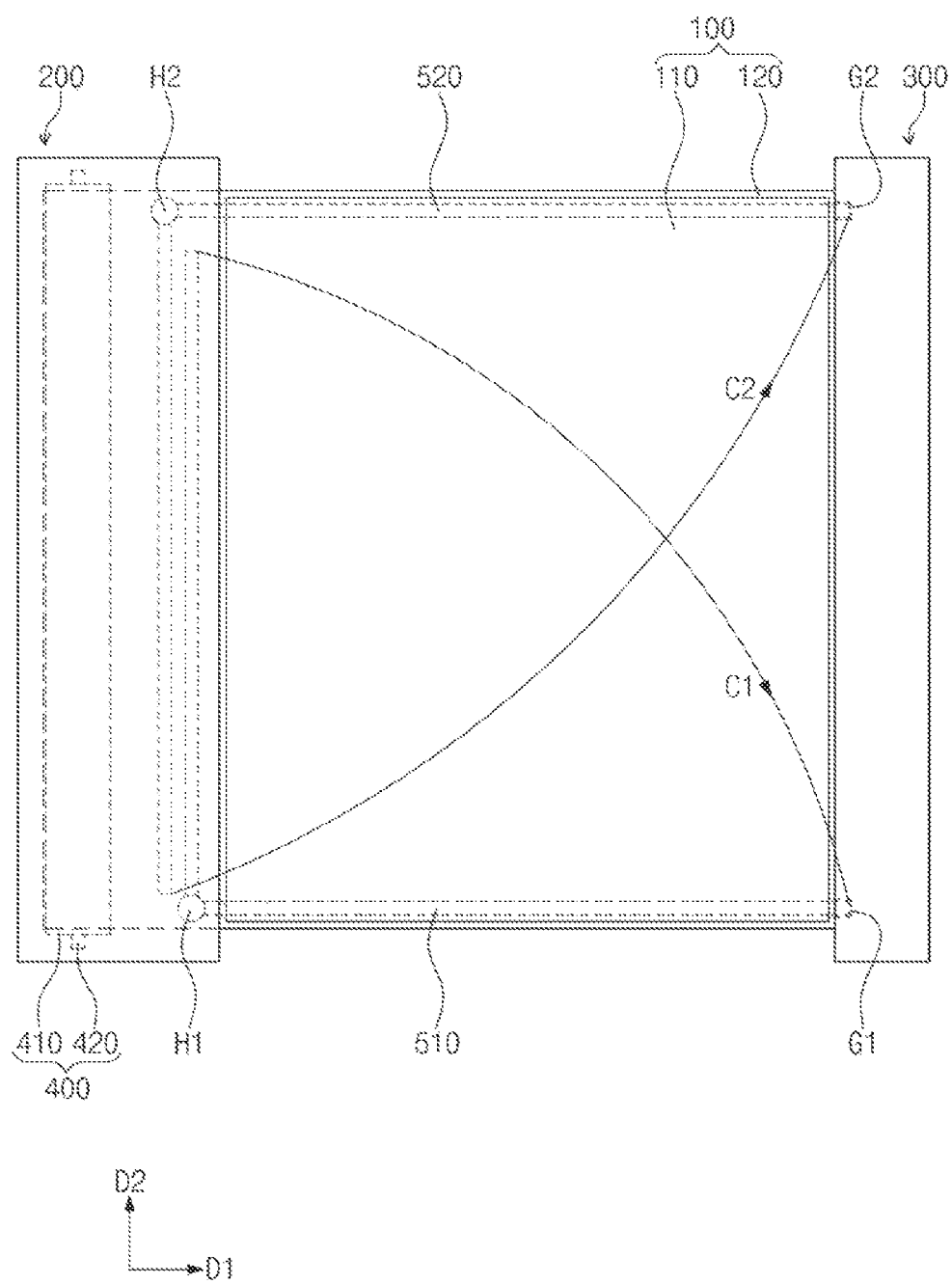
FIG. 9A is a plan view showing the flexible display according to the second exemplary embodiment of the present disclosure.
Figure 9B:
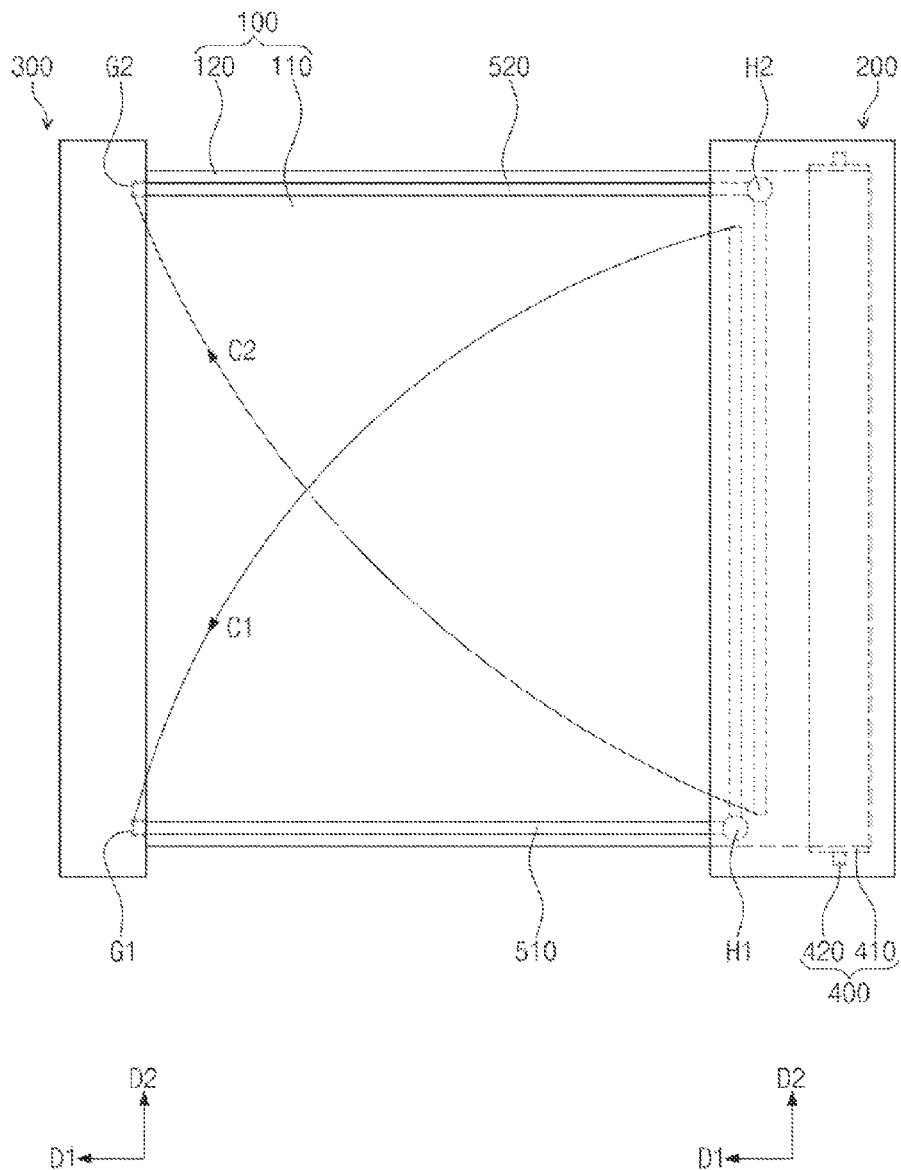
FIG. 9B is a rear view showing the flexible display according to the second exemplary embodiment of the present disclosure.

FIG. 9A is a plan view showing the flexible display according to the second exemplary embodiment of the present disclosure. FIG. 9B is a rear view showing the flexible display according to the second exemplary embodiment of the present disclosure.

Referring to FIGS. 9A and 9B, the first fixing member 510 can rotated in a clockwise direction C1 with respect to the first rotating member H1 and the second fixing member 520 can rotated in a counter-clockwise direction C2 with respect to the second rotating member H2 when viewed in the plan view.

The first and second fixing members 510 and 520 can be withdrawn from the accommodating part 200 through the opening portion 220 while being respectively rotated in the clockwise direction C1 and the counter-clockwise direction C2.

In detail, since the one side portion of the first fixing member 510 is fixed to the first rotating member H1 and the other side portion of the first fixing member 510 can be rotated in the clockwise direction C1, the other side portion of the first fixing member 510 can contact the grip part 300.

Since the one side portion of the second fixing member 520 is fixed to the second rotating member H2 and the other side portion of the second fixing member 520 can be rotated in the counter-clockwise direction C2, the other side portion of the second fixing member 520 can contact the grip part 300. Therefore, the first and second fixing members 510 and 520 are placed to allow a longitudinal direction of each of the first and second fixing members 510 and 520 to be substantially parallel to the first direction D1.

The other side portion of the first fixing member 510 can be engaged with the first recess G1 and the other side portion of the second fixing member 520 can be engaged with the second recess G2. Thus, the first fixing member 510 can be held by the first recess G1 and the second fixing member 520 can be held by the second recess G2.

When the first and second fixing members 510 and 520 are accommodated in the accommodating part 200, the second fixing member 520 is arranged to be closer to the one side of the accommodating part 200 in the first direction D1 than the first fixing member 510. That is, the first fixing member 510 is arranged closer to the opening portion 220 than the second fixing member 520. Therefore, the first fixing member 510 can be withdrawn from the accommodating part 200 prior to the second fixing member 520.

The display part 100 can be rolled in the direction of the accommodating part 200, which is opposite to the first direction D1, when unrolled in the first direction D1. The fixing part 500 prevents the display part 100 from being rolled in the direction of the accommodating part 200.

Consequently, the flexible display 1000a can hold the display part 100 such that the display part 100 is not rolled in the direction of the accommodating part 200 when the display part 100 is on and in use.

Figure 10:
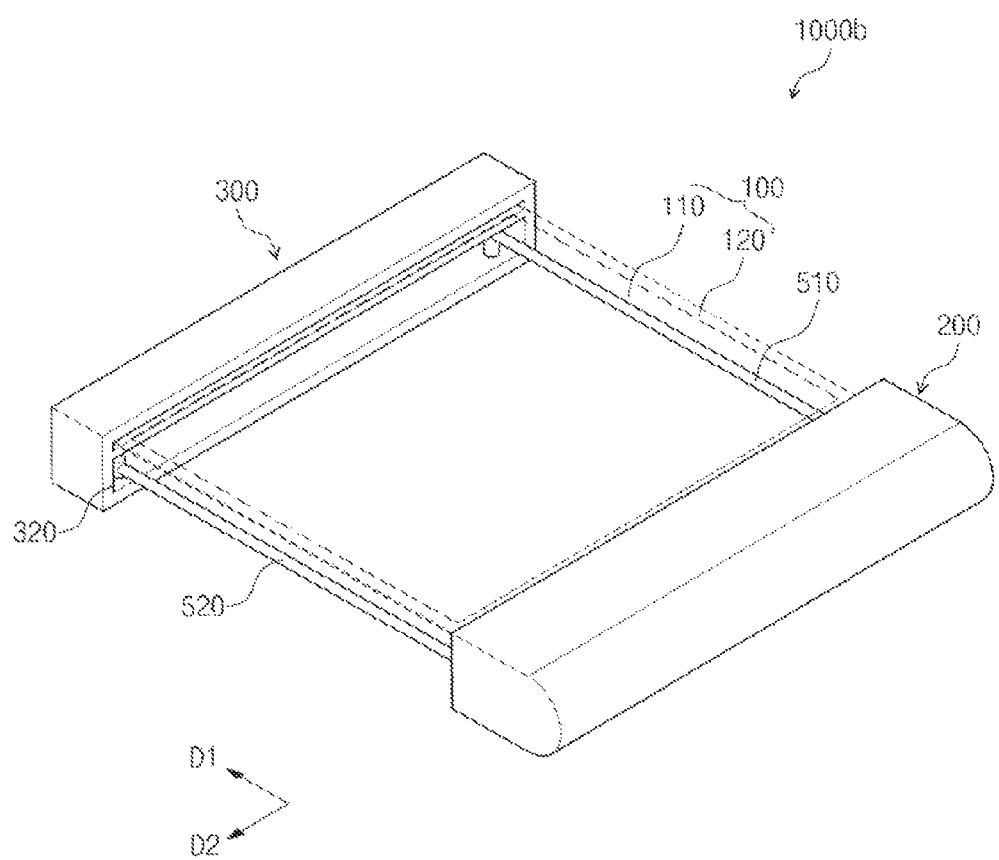
FIG. 10 is a perspective view showing a flexible display according to a third exemplary embodiment of the present disclosure.
Figure 11:
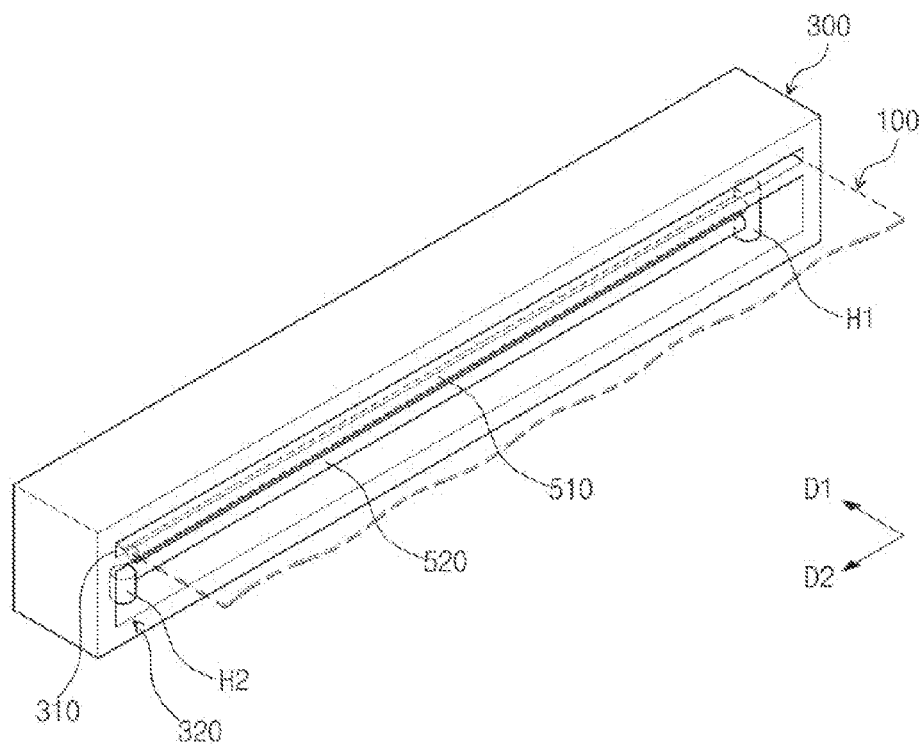
FIG. 11 is a perspective view showing the grip part according to the third exemplary embodiment of the present disclosure.

FIG. 10 is a perspective view showing a flexible display according to a third exemplary embodiment of the present disclosure. FIG. 11 is a perspective view showing a grip part according to the third exemplary embodiment of the present disclosure. In detail, FIG. 11 shows the one side surface of the grip part when viewed in the first direction D1.

In the present exemplary embodiment, the flexible display 1000b has substantially the same structure and function as that of the flexible display 1000 shown in FIGS. 1 to 5B except for an opening portion 220, a grip part 300, and a fixing member 500. Accordingly, detailed descriptions of elements included in the flexible display 1000b will be omitted except for the opening portion 220, the grip part 300, and the fixing member 500.

Referring to FIGS. 10 and 11, the grip part 300 according to the third exemplary embodiment accommodates the fixing member 500. The grip part 300 includes a sub-accommodating part or sub-housing 320 on the one side surface thereof in the first direction D1. Accordingly, the fixing part 500 can be accommodated in and withdrawn from the grip part 300 through the sub-accommodating part 320.

The fixing part 500 includes a first fixing member 510, a second fixing member 520, a first rotating member H1, and a second rotating member H2. The fixing part 500 is arranged adjacent to the sub-accommodating part 320 in the grip part 300. The first and second fixing members 510 and 520 extend in the second direction D2.

The first and second rotating members H1 and H2 are arranged on the inner surface of the grip part 300. In detail, the first rotating member H1 is arranged at one side portion of the grip part 300 in the second direction D2 and the second rotating member H2 is arranged at the other side portion of the grip part 300 in the second direction D2.

The first rotating member H1 is connected to one side portion of the first fixing member 510 in the second direction D2, and the second rotating member H2 is connected to the one side portion of the second fixing member 520 in the second direction D2.

In detail, the one side portion of the first fixing member 510 in the second direction D2 is connected to the first rotating member H1 and fixed to the grip part 300 and the other side portion of the first fixing member 510 in the second direction D2 is arranged adjacent to the second rotating member H2. In addition, the one side portion of the second fixing member 520 in the second direction D2 is connected to the second rotating member H2 and fixed to the grip part 300 and the other side portion of the second fixing member 520 in the second direction D2 is arranged adjacent to the first rotating member H1.

The first fixing member 510 is arranged at a position higher than the second fixing member 520. That is, the first and second fixing members 510 and 520 are arranged to be substantially parallel to the second direction D2.

The first and second rotating members H1 and H2 are configured to be rotated. In detail, the first and second rotating members H1 and H2 can rotate the first and second fixing members 510 and 520, which extend in the second direction D2, in the first direction D1 toward the accommodating part 200.

Figure 12:
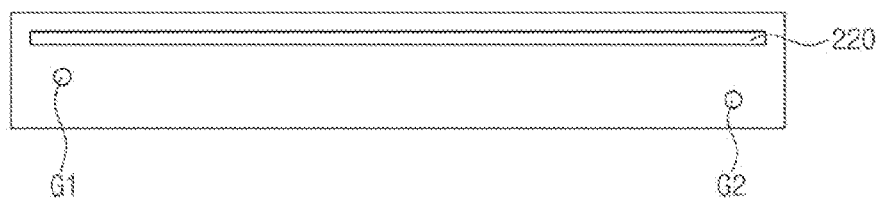
FIG. 12 is a view showing a side surface of the accommodating part according to the third exemplary embodiment of the present disclosure.

FIG. 12 is a view showing a side surface of the accommodating part 200 according to the third exemplary embodiment of the present disclosure. In detail, FIG. 12 shows the other side surface of the accommodating part 200 in the first direction D1.

Referring to FIG. 12, an opening portion 220, a first recess G1, and a second recess G2 are formed in the other side surface of the accommodating part 200 in the first direction D1.

The opening portion 220 has a substantially bar shape extending in the second direction D2. The length of the opening portion 220 in the second direction D2 is greater than or substantially equal to that of the display part 100 in the second direction D2. Accordingly, the display part 100 can be accommodated in and withdrawn from the accommodating part 200 through the opening portion 220.

The first and second recesses G1 and G2 are arranged under the opening portion 220 on the surface of the accommodating part 200, which faces the grip part 300. In detail, the first recess G1 is arranged at the one side portion of the accommodating part 200 in the second direction D2.

The second recess G2 is arranged at the other side portion of the accommodating part 200 in the second direction D2. That is, the second recess G2 is arranged under the other side portion of the opening portion 220 in the second direction D2. The first recess G1 is arranged at a position higher than that of the second recess G2 in the third direction D3.

Figure 13A:
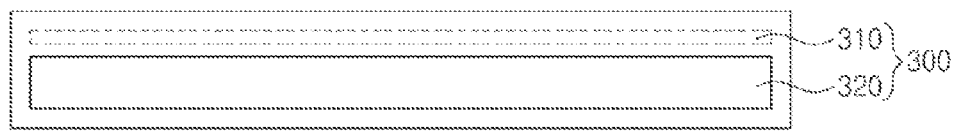
FIGS. 13A and 13B are views showing a side surface of the grip part according to the third exemplary embodiment of the present disclosure.
Figure 13B:
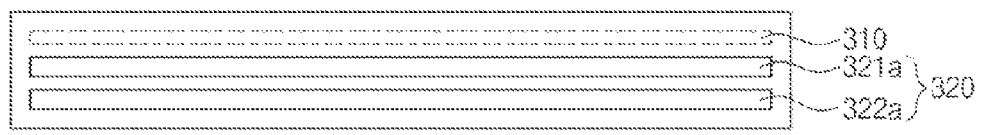

FIGS. 13A and 13B are views showing a side surface of a grip part 300 according to the third exemplary embodiment of the present disclosure.

Referring to FIG. 13A, the grip part 300 includes a connection portion 310 and a sub-accommodating part 320. The connection portion 310 is arranged on the one side surface of the grip part 300 in the first direction D1. The display part 100 is connected to the grip part 300 by the connection portion 310.

The sub-accommodating part 320 is arranged under the connection portion 310. The sub-accommodating part 320 has a substantially bar shape extending in the second direction D2. The length D2 of the sub-accommodating part 320 in the second direction is greater than or substantially equal to that of each of the first and second members 510 and 520. Accordingly, the first and second fixing members 510 and 520 can be accommodated in and withdrawn from the grip part 300 through the sub-accommodating part 320.

Referring to FIG. 13B, the sub-accommodating part 320 includes a first sub-accommodating part 321a and a second sub-accommodating part 322a. The first sub-accommodating part 321a is arranged under the connection portion 310 and the second sub-accommodating part 322a is arranged under the second sub-accommodating part 322a.

The first fixing member 510 can be accommodated in and withdrawn from the grip part 300 through the first sub-accommodating part 321a and the second fixing member 520 can be accommodated in and withdrawn from the grip part 300 through the second sub-accommodating part 322a.

Figure 14A:
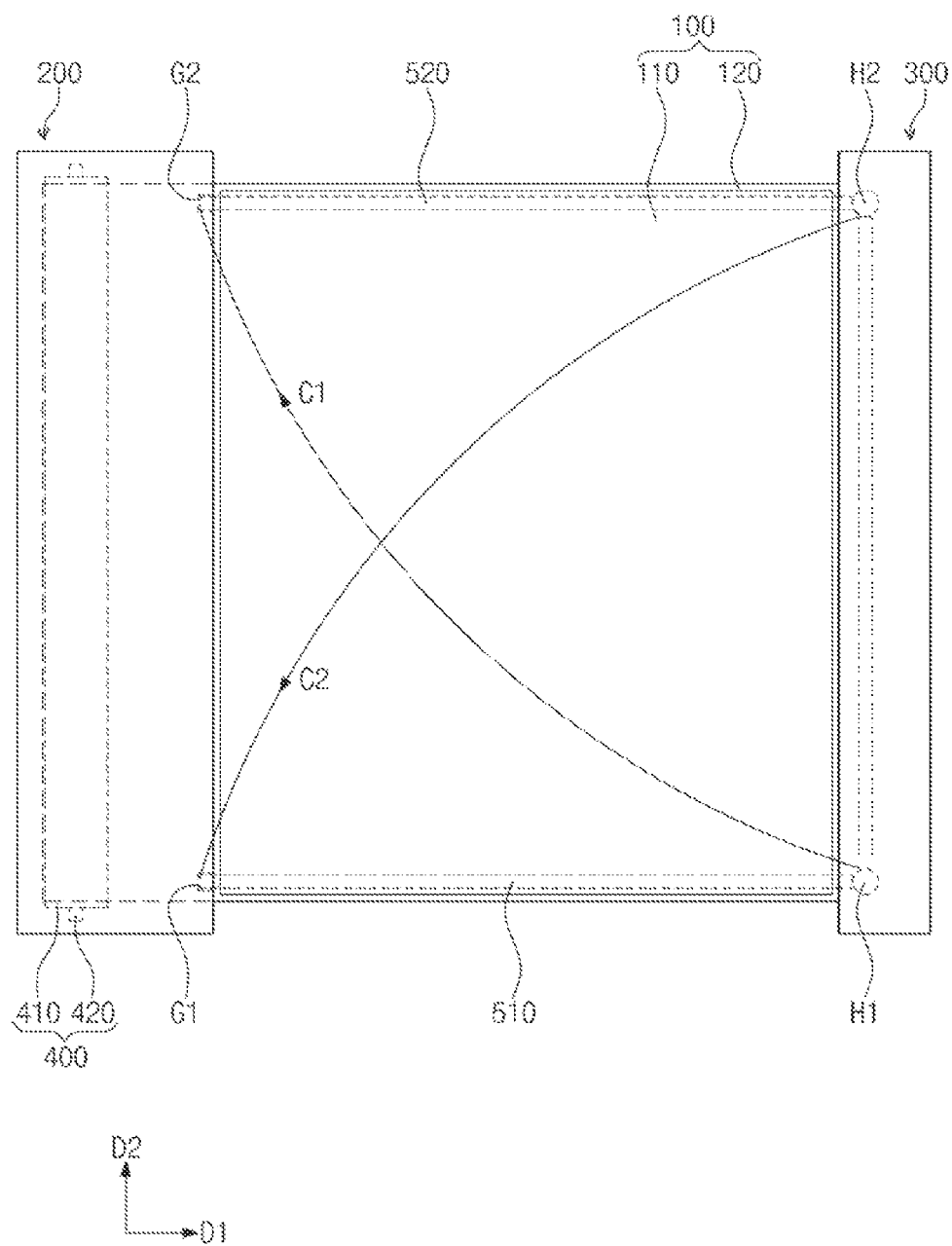
FIG. 14A is a plan view showing the flexible display according to the third exemplary embodiment of the present disclosure.
Figure 14B:
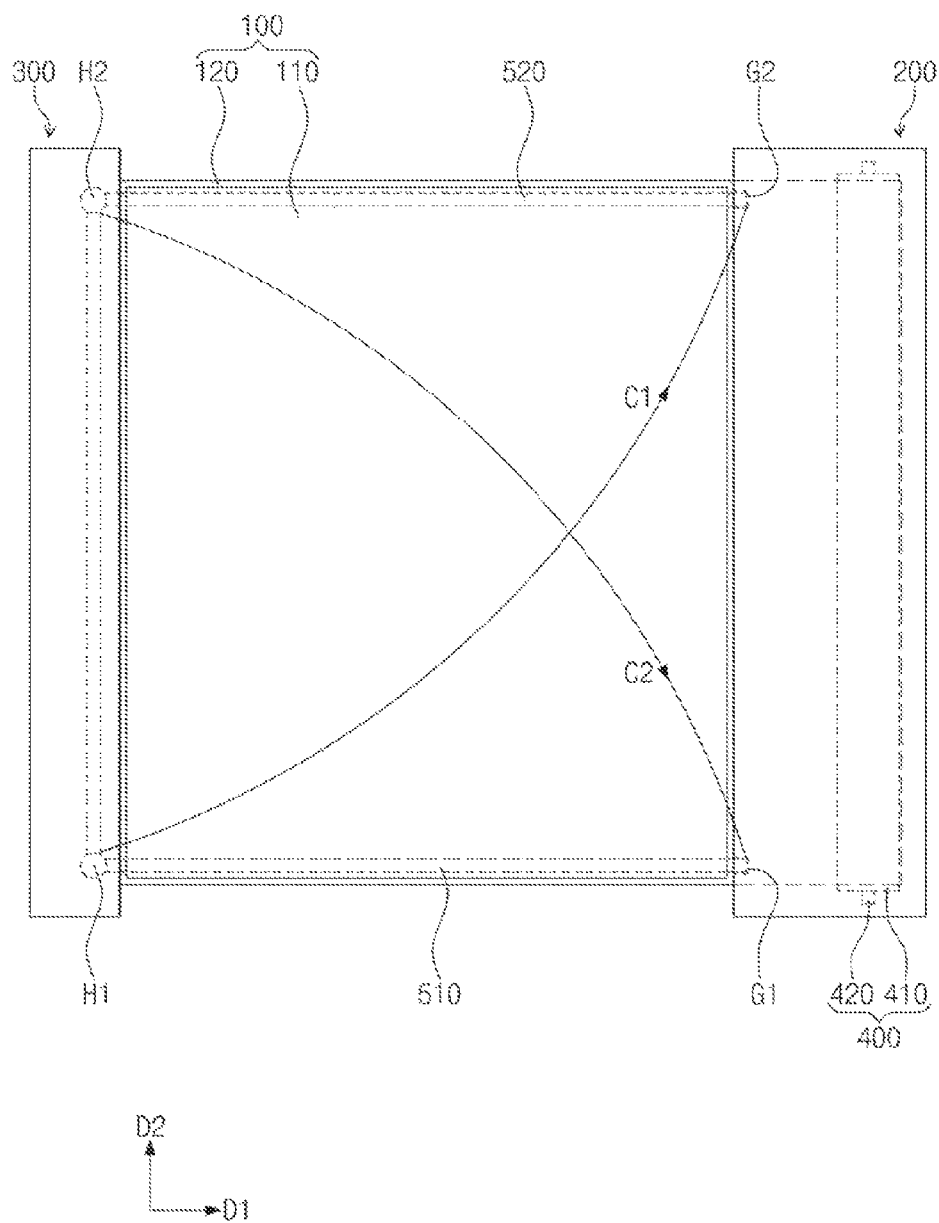
FIG. 14B is a rear view showing the flexible display according to the third exemplary embodiment of the present disclosure.

FIG. 14A is a plan view showing the flexible display according to the third exemplary embodiment of the present disclosure. FIG. 14B is a rear view showing the flexible display according to the third exemplary embodiment of the present disclosure.

Referring to FIGS. 14A and 14B, the first and second fixing members 510 and 520 can be respectively rotated by the first and second rotating members H1 and H2. That is, the first and second fixing members 510 and 520 extending in the second direction D2 can be rotated such that the longitudinal direction of each of the first and second fixing members 510 and 520 is rotated to extend in the first direction D1.

The first fixing member 510 can be rotated in a counter-clockwise direction C2 with respect to the first rotating member H1 and the second fixing member 520 can be rotated in a clockwise direction C1 with respect to the second rotating member H2 when viewed from the plan view.

The first and second fixing members 510 and 520 can be withdrawn from the grip part 300 through the sub-accommodating part 320 while being respectively rotated in the counter-clockwise direction C2 and the clockwise direction C1.

Since the one side portion of the first fixing member 510 is fixed to the first rotating member H1 and the other side portion of the first fixing member 510 can be rotated in the counter-clockwise direction C2, the other side portion of the first fixing member 510 can contact the accommodating part 200.

Since the one side portion of the second fixing member 520 is fixed to the second rotating member H2 and the other side portion of the second fixing member 520 can be rotated in the clockwise direction C1, the other side portion of the second fixing member 520 can contact the accommodating part 200. Therefore, the first and second fixing members 510 and 520 can be placed such that a longitudinal direction of each of the first and second fixing members 510 and 520 and is substantially parallel to the first direction D1.

The first fixing member 510 can be inserted into the first recess G1 of the accommodating part 200 and the second fixing member 520 can be inserted into the second recess G2 of the accommodating part 200. Thus, the first fixing member 510 can be held by the first recess G1 and the second fixing member 520 can be held by the second recess G2.

The display part 100 can be rolled in the direction of the accommodating part 200, which is opposite to the first direction D1, when unrolled in the first direction D1. The fixing part 500 can prevent the display part 100 from being rolled in the direction of the accommodating part 200.

Consequently, the flexible display 1000b can hold the display part 100 such that the display part 100 is not rolled in the direction of the accommodating part 200 when the display part 100 is on and in use.

Figure 15:
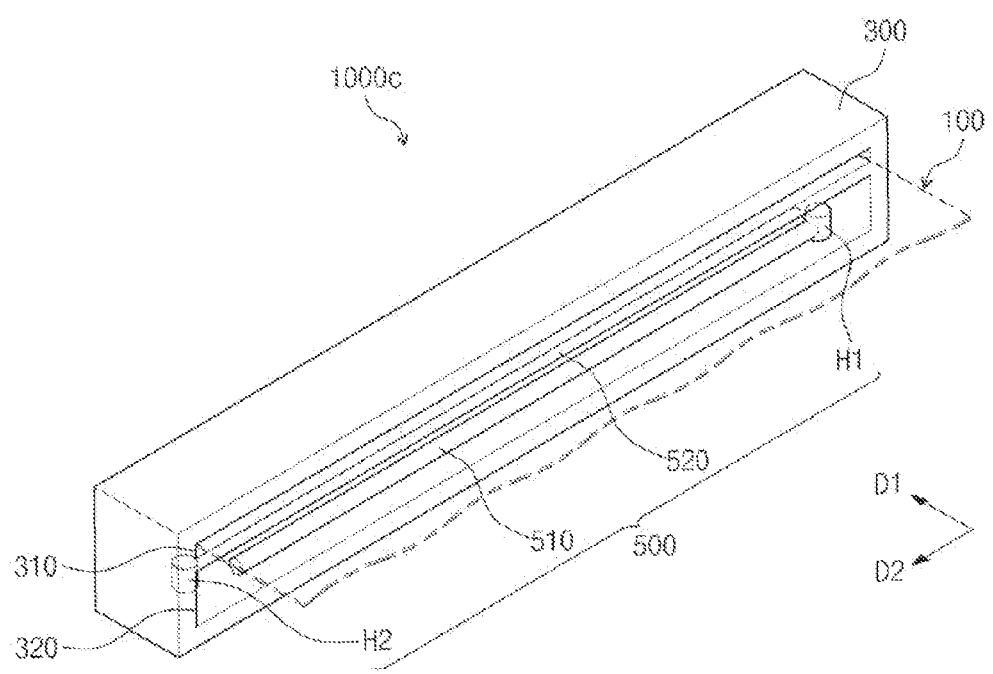
FIG. 15 is a perspective view showing a grip part according to a fourth exemplary embodiment of the present disclosure.

FIG. 15 is a perspective view showing a grip part according to a fourth exemplary embodiment of the present disclosure. In detail, FIG. 15 shows the one side surface of the grip part 300 in the first direction D1.

In the present exemplary embodiment, the flexible display 1000c has substantially the same structure and function as that of the flexible display 1000 shown in FIGS. 1 to 5B except for an opening portion 220, a grip part 300, and a fixing member 500. Accordingly, detailed descriptions of elements included in the flexible display 1000c will be omitted except for the opening portion 220, the grip part 300, and the fixing member 500.

Referring to FIG. 15, the grip part 300 according to the fourth exemplary embodiment accommodates the fixing member 500. The grip part 300 includes a sub-accommodating part 320 on the one side surface thereof in the first direction D1. Accordingly, the fixing part 500 can be accommodated in and withdrawn from the grip part 300 through the sub-accommodating part 320.

The fixing part 500 includes a first fixing member 510, a second fixing member 520, a first rotating member H1, and a second rotating member H2. The fixing part 500 is arranged adjacent to the sub-accommodating part 320 in the grip part 300.

In detail, the one side portion of the first fixing member 510 in the second direction D2 is connected to the first rotating member H1 and fixed to the grip part 300 and the other side portion of the first fixing member 510 in the second direction D2 is arranged adjacent to the second rotating member H2. In addition, the one side portion of the second fixing member 520 in the second direction D2 is connected to the second rotating member H2 and fixed to the grip part 300 and the other side portion of the second fixing member 520 in the second direction D2 is arranged adjacent to the first rotating member H1.

The first and second fixing members 510 and 520 are arranged in substantially the same horizontal plane surface. The second fixing member 520 is arranged at the other side portion of the first fixing member 510 in the first direction D1. In addition, the second rotating member H2 is arranged at the other side portion of the first rotating member H1 in the first direction D1. That is, the second fixing member 520 and the second rotating member H2 are arranged closer to the other side portion of the grip part 300 in the first direction D1 than the first fixing member 510 and the first rotating member H1.

The length of the first fixing member 510 in the second direction D2 is less than the length of the second fixing member 520 in the second direction D2. The difference in the length between the first and second fixing members 510 and 520 in the second direction D2 corresponds to the distance between the first and second fixing members 510 and 520 in the first direction D1.

Figure 16:
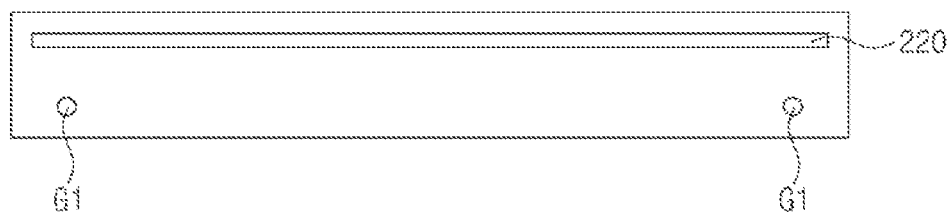
FIG. 16 is a view showing a shape of an opening portion according to the fourth exemplary embodiment of the present disclosure.

FIG. 16 is a view showing a shape of an opening portion according to the fourth exemplary embodiment of the present disclosure.

Referring to FIG. 16, an opening portion 220, a first recess G1, and a second recess G2 are arranged at the other side surface of the accommodating part 200 in the first direction D1.

The opening portion 220 has a substantially bar shape extending in the second direction D2. The length of the opening portion 220 in the second direction D2 is greater than or substantially equal to that of the display part 100 in the second direction D2. Accordingly, the display part 100 can be accommodated in and withdrawn from the accommodating part 200 through the opening portion 220.

The first and second recesses G1 and G2 are arranged under the opening portion 220 and arranged on substantially the same horizontal plane surface. In detail, the first recess G1 is arranged under the one side portion of the opening portion 220 in the second direction D2. The second recess G2 is arranged under the other side portion of the opening portion 220 in the second direction D2.

Figure 17:
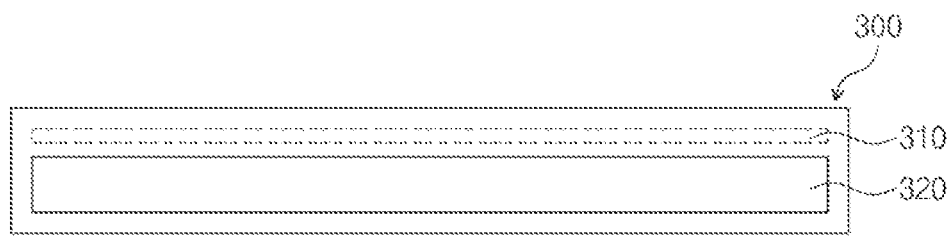
FIG. 17 is a view showing a side surface of a grip part according to the fourth exemplary embodiment of the present disclosure.

FIG. 17 is a view showing a side surface of the grip part 300 according to the fourth exemplary embodiment of the present disclosure.

Referring to FIG. 17, the grip part 300 includes a connection portion 310 and a sub-accommodating part 320. The connection portion 310 is arranged on the one side surface of the grip part 300 in the first direction D1. The display part 100 is connected to the grip part 300 by the connection portion 310.

The sub-accommodating part 320 is arranged under the connection portion 310. The sub-accommodating part 320 has a substantially bar shape extending in the second direction D2. The length of the sub-accommodating part 320 in the second direction D2 is greater than or substantially equal to that of each of the first and second members 510 and 520. Accordingly, the first and second fixing members 510 and 520 can be accommodated in and withdrawn from the grip part 300 through the sub-accommodating part 320.

Figure 18A:
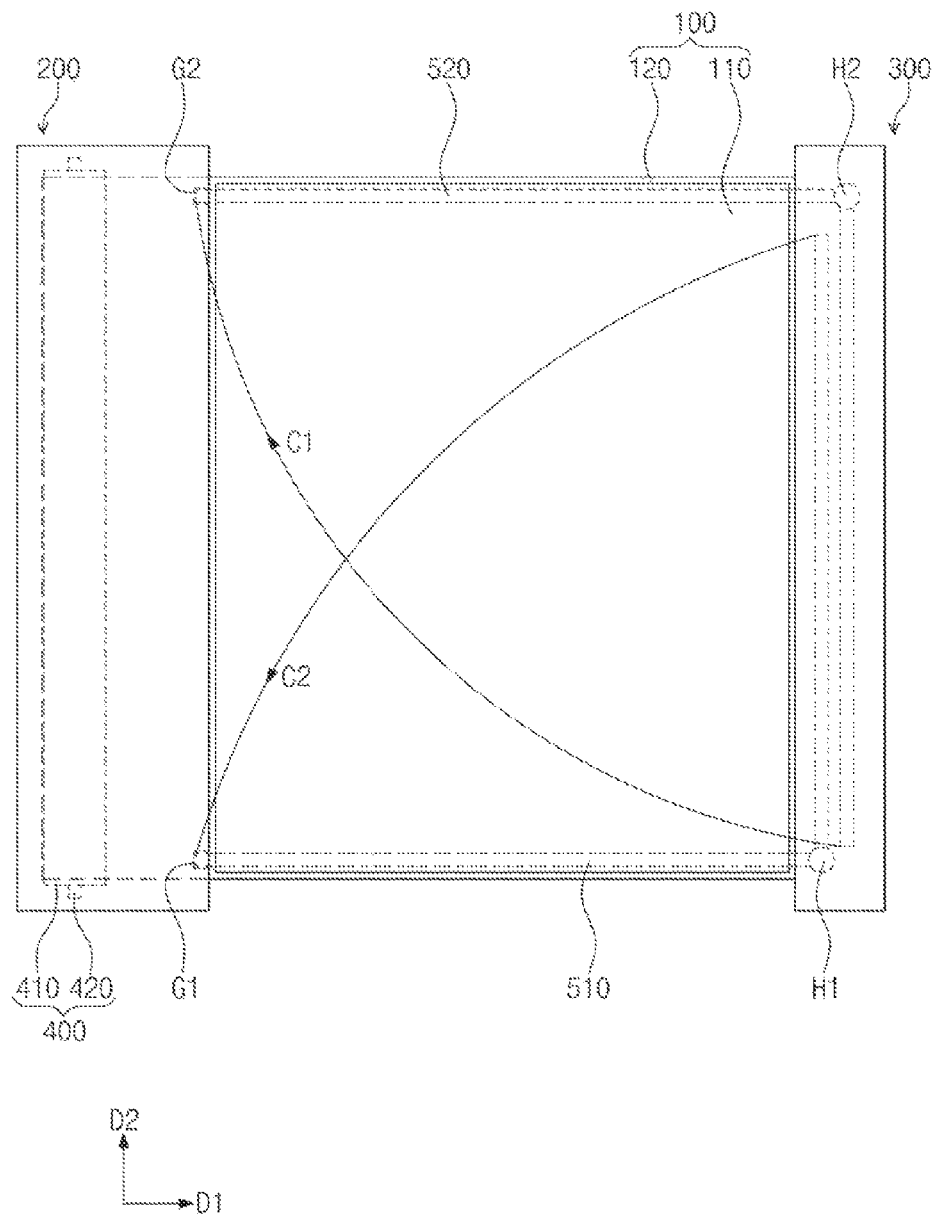
FIG. 18A is a plan view showing the flexible display according to the fourth exemplary embodiment of the present disclosure.
Figure 18B:
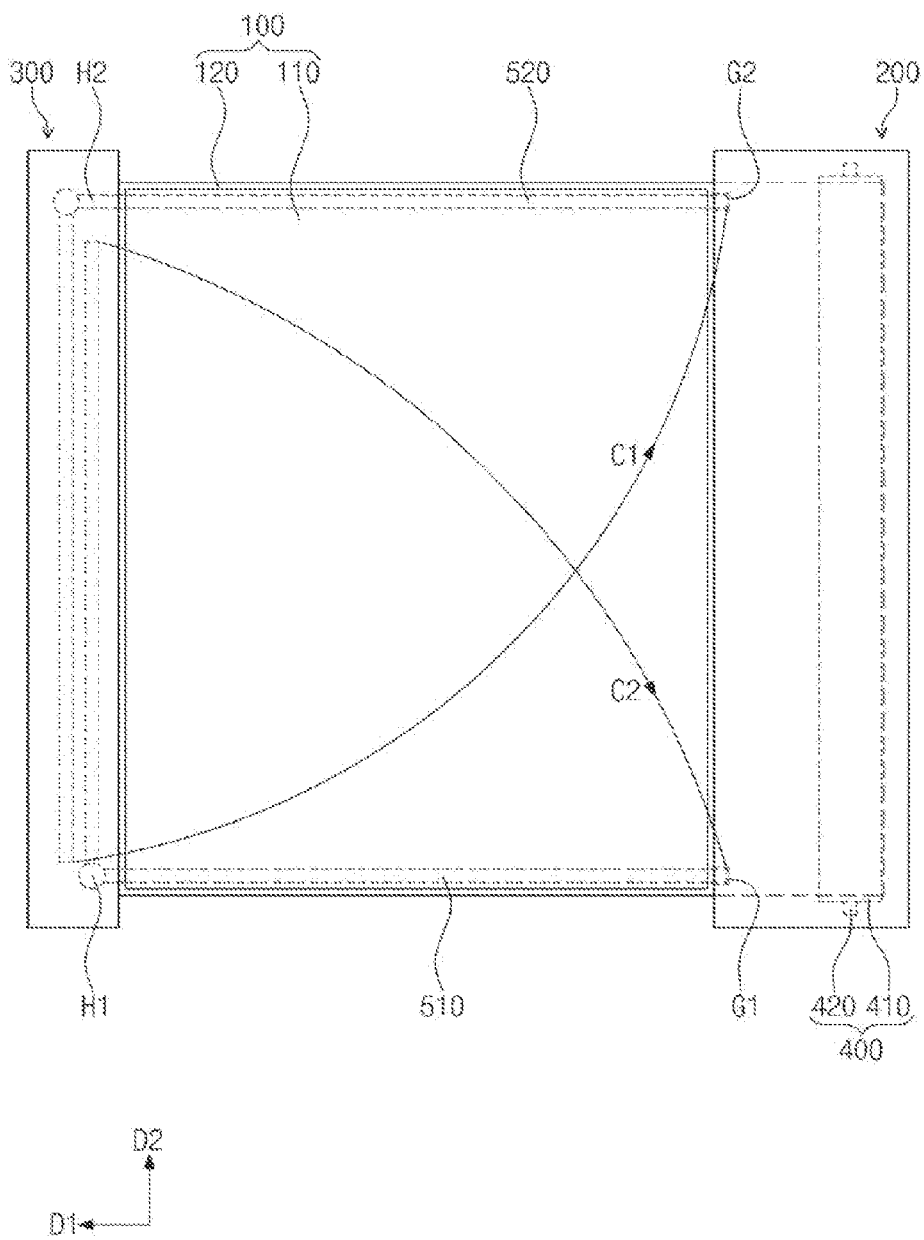
FIG. 18B is a rear view showing the flexible display according to the fourth exemplary embodiment of the present disclosure.

FIG. 18A is a plan view showing the flexible display according to the fourth exemplary embodiment of the present disclosure. FIG. 18B is a rear view showing the flexible display according to the fourth exemplary embodiment of the present disclosure.

Referring to FIGS. 18A and 18B, the first fixing member 510 can be rotated in a counter-clockwise direction C2 with respect to the first rotating member H1 and the second fixing member 520 can be rotated in a clockwise direction C1 with respect to the second rotating member H2.

Since the one side portion of the first fixing member 510 is fixed to the first rotating member H1 and the other side portion of the first fixing member 510 can be rotated in the counter-clockwise direction C2 in the second direction D2, the other side portion of the first fixing member 510 can contact the accommodating part 200.

Since the one side portion of the second fixing member 520 is fixed to the second rotating member H2 and the other side portion of the second fixing member 520 can be rotated in the clockwise direction C1, the other side portion of the second fixing member 520 can contact the accommodating part 200. Therefore, the first and second fixing members 510 and 520 can be placed to allow a longitudinal direction of each of the first and second fixing members 510 and 520 to be substantially parallel to the first direction D1.

The first fixing member 510 can be engaged with the first recess G1 of the accommodating part 200 and the second fixing member 520 can be engaged with the second recess G2 of the accommodating part 200. Thus, the first fixing member 510 can be held by the first recess G1 and the second fixing member 520 can be held by the second recess G2.

When the first and second fixing members 510 and 520 are accommodated in the grip part 300, the second fixing member 520 is arranged closer to the other side portion of the grip part 300 than the first fixing member 510 in the first direction D1. Therefore, the first fixing member 510 can be withdrawn from the accommodating part 200 prior to the second fixing member 520.

The display part 100 can be rolled in the direction of the accommodating part 200, which is opposite to the first direction D1, when unrolled in the first direction D1. The fixing part 500 can prevent the display part 100 from being rolled in the direction of the accommodating part 200.

Consequently, the flexible display 1000c can hold the display part 100 such that the display part 100 is not rolled in the direction of the accommodating part 200 when the display part 100 is on and in use.

Figure 19A:
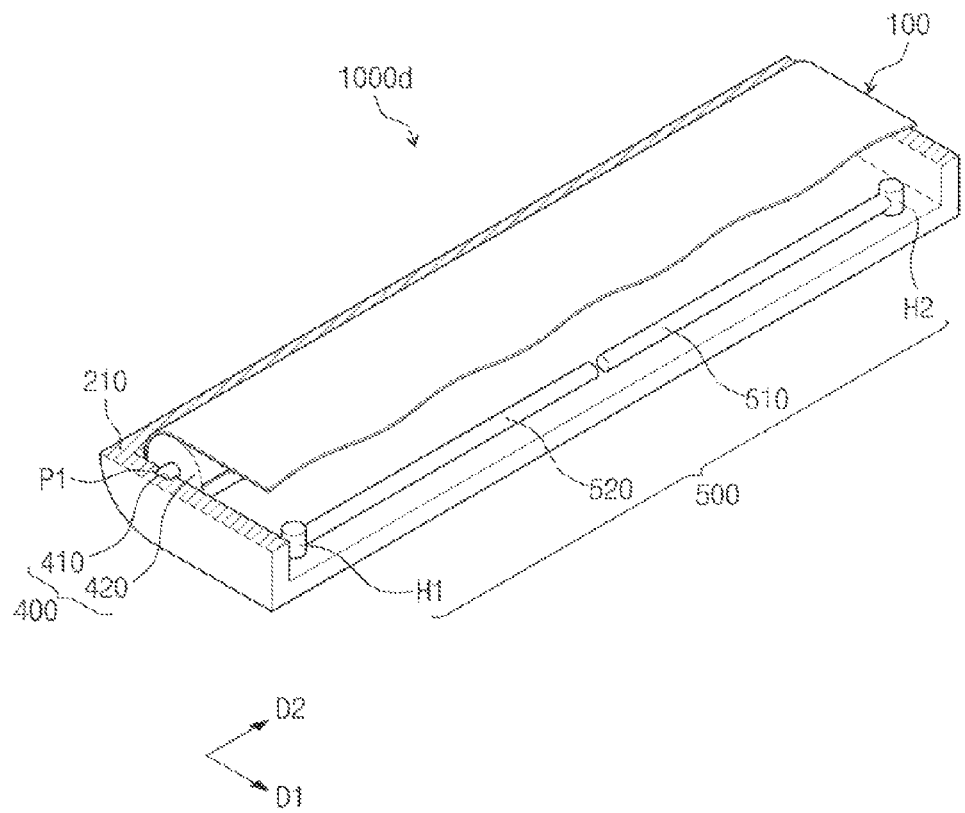
FIG. 19A is a perspective view showing an accommodating part according to a fifth exemplary embodiment of the present disclosure.
Figure 19B:
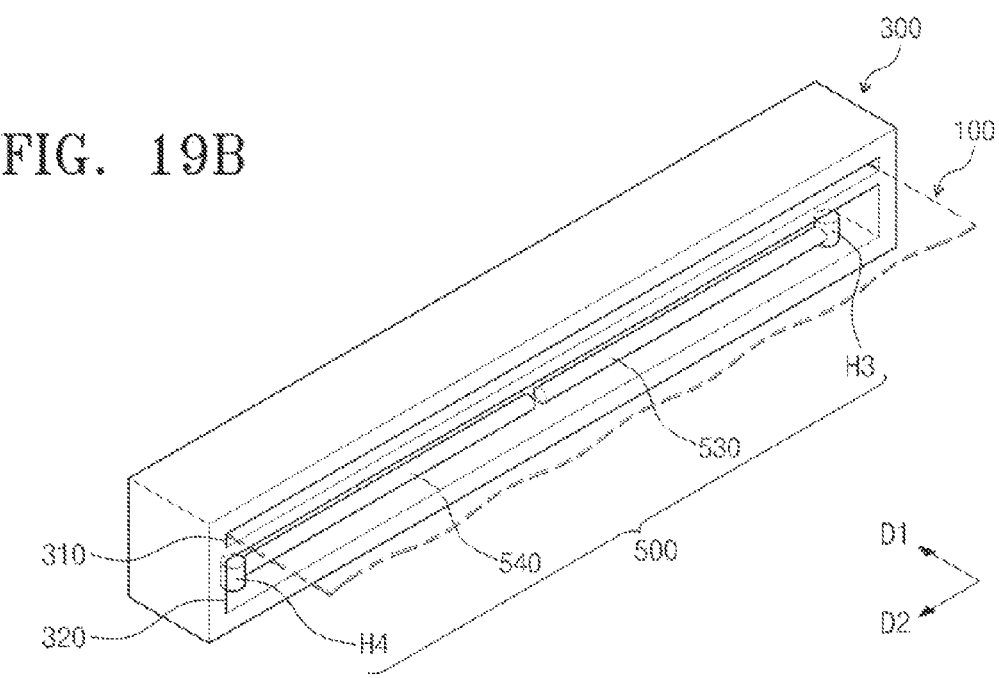
FIG. 19B is a perspective view showing a grip part according to the fifth exemplary embodiment of the present disclosure.

FIG. 19A is a perspective view showing an accommodating part according to a fifth exemplary embodiment of the present disclosure. FIG. 19B is a perspective view showing a grip part according to a fifth exemplary embodiment of the present disclosure.

In the present exemplary embodiment, the flexible display 1000d has substantially the same structure and function as that of the flexible display 1000 shown in FIGS. 1 to 5B except for an opening portion 220, a grip part 300, and a fixing member 500. Accordingly, detailed descriptions of elements included in the flexible display 1000d will be omitted except for the opening portion 220, the grip part 300, and the fixing member 500.

Referring to FIGS. 19A and 19B, the fixing part 500 according to the fifth exemplary embodiment includes first, second, third, and fourth fixing members 510, 520, 530, and 540 and first, second, third, and fourth rotating members H1, H2, H3, and H4.

The first and second fixing members 510 and 520 can be accommodated in the accommodating part 200 and the third and fourth fixing members 530 and 540 can be accommodated in the grip part 300.

The first and second rotating members H1 and H2 are arranged on the inner surface of the accommodating part 200. In detail, the first rotating member H1 is arranged at the one side portion of the accommodating part 200 in the second direction D2 and the second rotating member H2 is arranged at the other side portion of the accommodating part 200 in the second direction D2. The first and second rotating members H1 and H2 are arranged adjacent to the opening portion 220 in the first direction D1.

The first rotating member H1 is connected to the one side portion of the first fixing member 510 in the second direction D2 and the second rotating member H2 is connected to the one side portion of the second fixing member 520 in the second direction D2. Thus, the one side portion of the first fixing member 510 is connected to the first rotating member H1 and fixed to the accommodating part 200 and the one side portion of the second fixing member 520 is connected to the second rotating member H2 and fixed to the accommodating part 200.

The first and second fixing members 510 and 520 are arranged on substantially the same horizontal plane surface in the second direction D2. The other side portion of the first fixing member 510 in the second direction D2 is arranged to face the other side portion of the second fixing member 520 in the second direction D2.

The third and fourth rotating members H3 and H4 are arranged on the inner surface of the grip part 300. In detail, the third rotating member H3 is arranged at the one side portion of the grip part 300 in the second direction D2 and the fourth rotating member H4 is arranged at the other side portion of the grip part 300 in the second direction D2. The third and fourth rotating members H3 and H4 are arranged adjacent to the sub-accommodating part 320 in the first direction D1.

The third rotating member H3 is connected to the one side portion of the third fixing member 530 in the second direction D2 and the fourth rotating member H4 is connected to the one side portion of the fourth fixing member 540 in the second direction D2. Thus, the one side portion of the third fixing member 530 is connected to the third rotating member H3 and fixed to the grip part 300 and the one side portion of the fourth fixing member 540 is connected to the fourth rotating member H4 and fixed to the grip part 300.

The third and fourth fixing members 530 and 540 are arranged on substantially the same horizontal plane surface in the second direction D2. The other side portion of the third fixing member 530 in the second direction D2 is arranged to face the other side portion of the fourth fixing member 540 in the second direction D2.

Figure 20B:
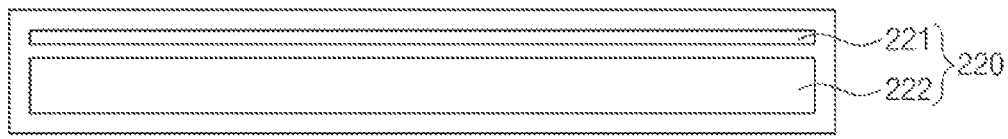
FIGS. 20A and 20B are views showing the various shapes of an opening portion according to the fifth exemplary embodiment of the present disclosure.
Figure 20A:
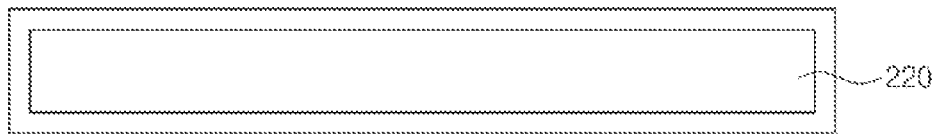

FIGS. 20A and 20B are views showing various shapes of the opening portion according to the fifth exemplary embodiment of the present disclosure.

Referring to FIG. 20A, the opening portion 220 has a substantially bar shape extending in the second direction D2. The length of the opening portion 220 in the second direction D2 is greater than or substantially equal to that of the display part 110. Accordingly, the display part 110, the first fixing member 510, and the second fixing member 520 can be accommodated in and withdrawn from the accommodating part 200 through the opening portion 220.

Referring to FIG. 20B, the opening portion 220 includes a first opening portion 221 and a second opening portion 222. The first opening portion 221 is arranged above the second opening portion 222.

The display part 100 can be accommodated in and withdrawn from the accommodating part 200 through the first opening portion 221.

The first and second fixing members 510 and 520 can be accommodated in and withdrawn from the accommodating part 200 through the second opening portion 222.

Figure 21:
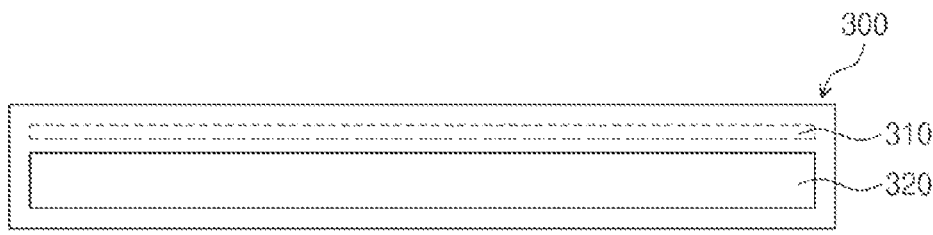
FIG. 21 is a view showing a side surface of the grip part according to the fifth exemplary embodiment of the present disclosure.

FIG. 21 is a view showing a side surface of the grip part 300 according to a fifth exemplary embodiment of the present disclosure.

Referring to FIG. 21, the grip part 300 includes a connection portion 310 and a sub-accommodating part 320. The connection portion 310 is arranged on the one side surface of the grip part 300 in the first direction D1. The display part 100 is connected to the grip part 300 by the connection portion 310.

The sub-accommodating part 320 is arranged under the connection portion 310. The sub-accommodating part 320 has a substantially bar shape extending in the second direction D2. The third and fourth fixing members 530 and 540 can be accommodated in and withdrawn from the grip part 300 through the sub-accommodating part 320.

Figure 22A:
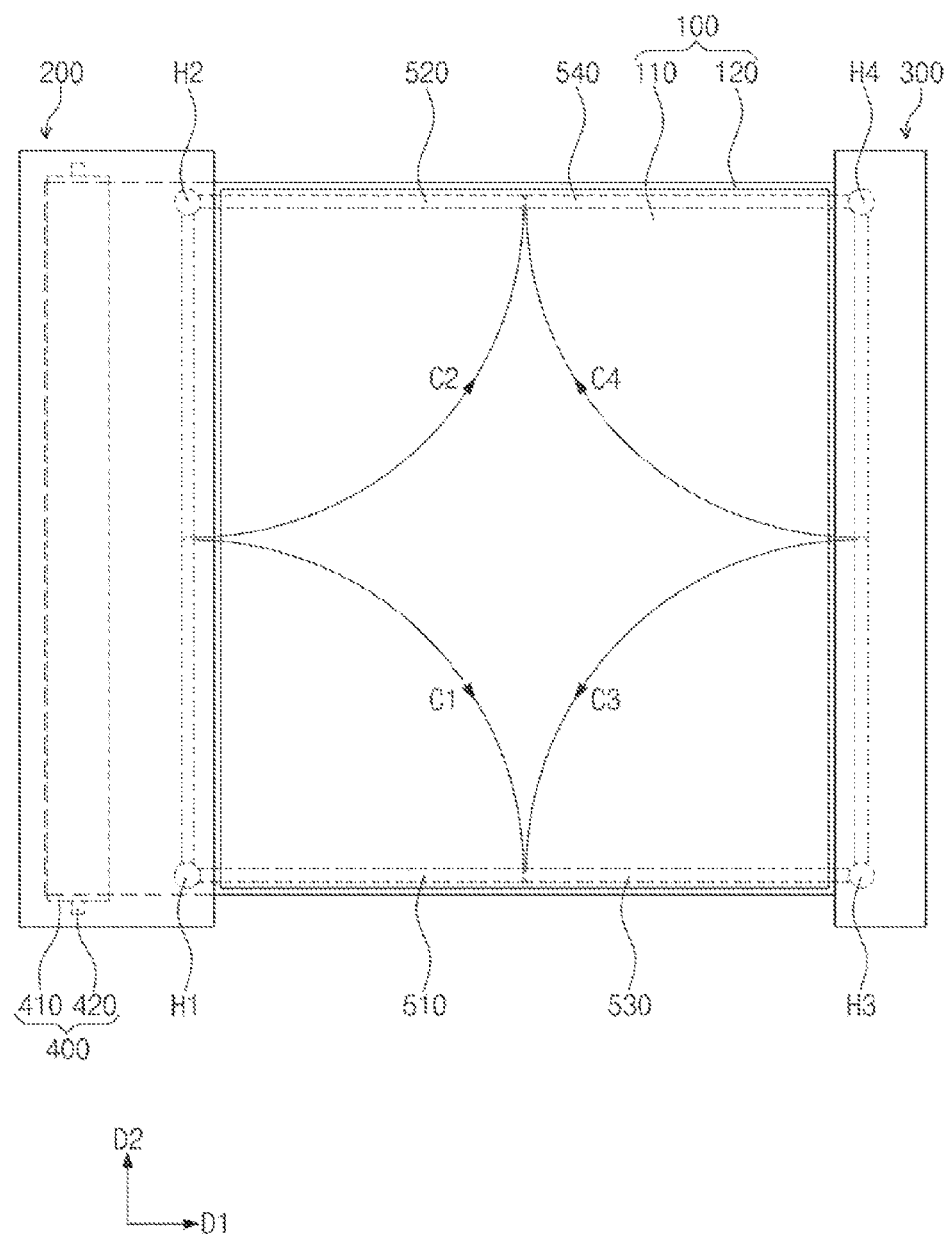
FIG. 22A is a plan view showing the flexible display according to the fifth exemplary embodiment of the present disclosure.
Figure 22B:
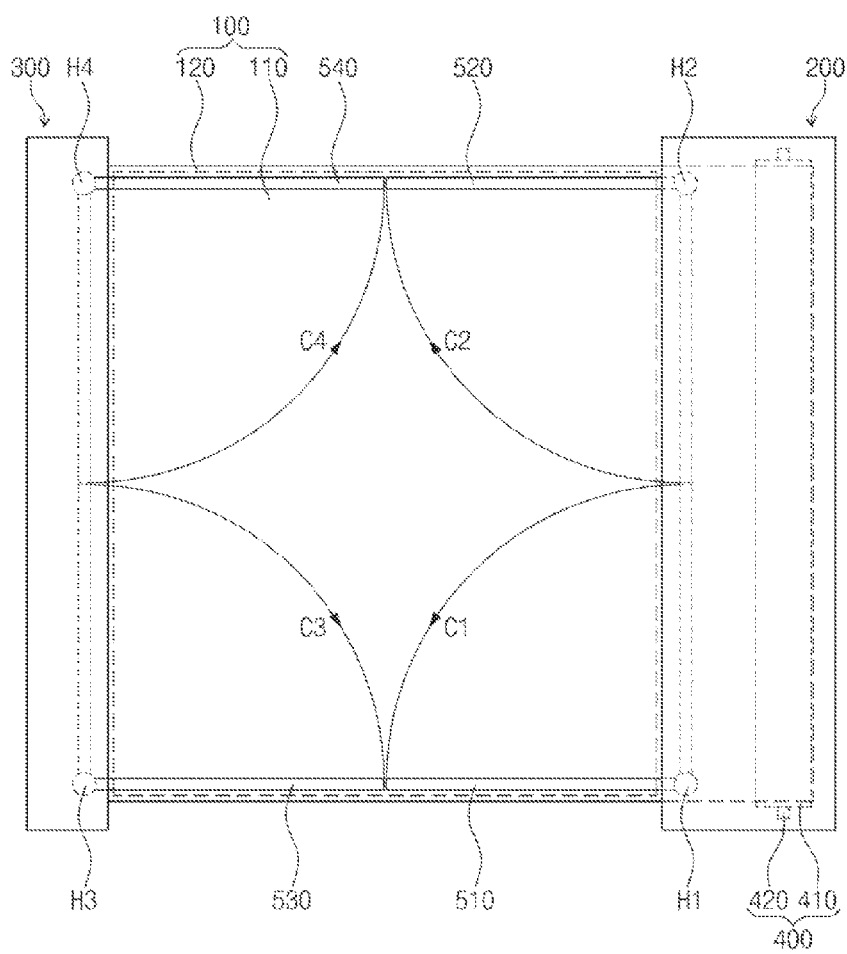
FIG. 22B is a rear view showing the flexible display according to the fifth exemplary embodiment of the present disclosure.
Figure 22B:
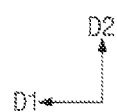

FIG. 22A is a plan view showing the flexible display according to the fifth exemplary embodiment of the present disclosure. FIG. 22B is a rear view showing the flexible display according to the fifth exemplary embodiment of the present disclosure.

Referring to FIGS. 22A and 22B, the first fixing member 510 can be rotated in a clockwise direction C1 with respect to the first rotating member H1. The second fixing member 520 can be rotated in a counter-clockwise direction C2 with respect to the second rotating member H2.

The third fixing member 530 can be rotated in the counter-clockwise direction C3 with respect to the third rotating member H3. The fourth fixing member 540 can be rotated in the clockwise direction C4 with respect to the fourth rotating member H4.

The first and second fixing members 510 and 520 can be withdrawn from the accommodating part 200 through the opening portion 220 while being respectively rotated in the clockwise direction C1 and the counter-clockwise direction C2.

The third and fourth fixing members 530 and 540 can be withdrawn from the grip part 300 through the sub-accommodating part 320 while being respectively rotated in the counter-clockwise direction C3 and the clockwise direction C4.

The one side portion of the first fixing member 510 is fixed to the first rotating member H1 and the other side portion of the first fixing member 510 can be rotated in the clockwise direction C1.

The one side portion of the third fixing member 530 is fixed to the third rotating member H3 and the other side portion of the third fixing member 530 can be rotated in the counter-clockwise direction C2.

Since the other side portion of the first fixing member 510 and the other side portion of the third fixing member 530 can be respectively rotated in the clockwise and counter-clockwise directions C1 and C3, the first and third fixing members 510 and 530 can be arranged such that a longitudinal direction of each of the first and third fixing members 510 and 530 is substantially parallel to the first direction D1.

The one side portion of the second fixing member 520 is fixed to the second rotating member H2 and the other side portion of the second fixing member 520 can be rotated in the counter-clockwise direction C2.

The one side portion of the fourth fixing member 540 is fixed to the fourth rotating member H4 and the other side portion of the fourth fixing member 540 can be rotated in the clockwise direction C1.

Since the other side portion of the second fixing member 520 and the other side portion of the fourth fixing member 540 can be respectively rotated in the counter-clockwise and clockwise directions C2 and C4, the second and fourth fixing members 520 and 540 can be arranged such that a longitudinal direction of each of the second and fourth fixing members 520 and 540 is substantially parallel to the first direction D1.

Each of first to fourth fixing members 510 to 540 can include a magnet. In detail, an attractive force is present between the cross-sectional surfaces of the other side portions of the first fixing member 510 and the third fixing member 530. Similarly, an attractive force is present between the cross-sectional surfaces of the other side portions of the second fixing member 520 and the fourth fixing member 540.

As another example, the other side portion of the first fixing member 510 has a shape that can be engaged with that of the other side portion of the third fixing member 530. Thus, the other side portion of the first fixing member 510 can have an indented shape and the other side portion of the third fixing member 530 can have protruding shape.

The other side portion of the second fixing member 520 has a shape that can be engaged with that of the other side portion of the fourth fixing member 540. Thus, the other side portion of the second fixing member 520 can have an indented shape and the other side portion of the fourth fixing member 540 can have a protruding shape.

Accordingly, the first fixing member 510 can be engaged with the third fixing member 530 and the second fixing member 520 can be engaged with the fourth fixing member 540.

The display part 100 can be rolled in the direction of the accommodating part 200, which is opposite to the first direction D1, when unrolled in the first direction D1. The fixing part 500 can prevent the display part 100 from being rolled in the direction of the accommodating part 200.

Consequently, the flexible display 1000d can hold the display part 100 such that the display part 100 is not rolled in the direction of the accommodating part 200 when the display part 100 is on and in use.

Although the exemplary embodiments of the inventive technology have been described, it is understood that the present invention should not be limited to these exemplary embodiments but various changes and modifications can be made by one ordinary skilled in the art within the spirit and scope of the inventive technology as hereinafter claimed.

What is claimed is:

1. A flexible display, comprising:
   a flexible display panel;
   a housing for the flexible display, wherein the flexible display panel is configured to be withdrawn from a surface of the housing;
   a grip connected to a first end of the flexible display panel and having a surface that opposes the surface of the housing in a first direction, the grip comprising: i) a connection portion connected to the flexible display panel and ii) a plurality of recesses formed adjacent to the connection portion; and
   a plurality of fixing members connected to one of the housing or the grip,
   wherein the fixing members are configured to: i) extend in a second direction crossing the first direction when the flexible display panel is accommodated in the housing and ii) rotate in a predetermined direction so as to be substantially parallel to the first direction when the flexible display panel is withdrawn from the housing, and
   wherein the fixing members are configured to be: i) engaged with the recesses when the flexible display panel is withdrawn from the housing and ii) disengaged from the recesses when the flexible display panel is accommodated in the housing.

2. The flexible display of claim 1, wherein a second end of the flexible display panel opposing the first end in the first direction is connected to the housing and wherein the housing and the grip each have a length extending in the second direction.

3. The flexible display of claim 2, further comprising a rotating part housed in the housing, wherein the flexible display panel is configured to be rolled around the rotating part in a predetermined rotating direction, and wherein the rotating part comprises:
   a rotating cylinder having a substantially cylindrical shape extending in the second direction, wherein the flexible display panel is configured to be wrapped around an outer surface of the rotating cylinder; and
   a rotating shaft penetrating the rotating cylinder in the second direction and extending in the second direction,
   wherein opposing ends of the rotating shaft protrude from ends of the rotating cylinder,
   wherein the opposing ends of the rotating shaft are connected to an inner surface of the housing in the second direction, and
   wherein the rotating cylinder is configured to rotate around the rotating shaft.

4. The flexible display of claim 2, wherein the fixing members comprise:
   first and second fixing members each having a substantially bar shape; and
   first and second rotating members each being respectively connected to first ends of the first and second fixing members,
   wherein the first and second fixing members are configured to respectively rotate with respect to the first and second rotating members, and
   wherein the first and second fixing members are configured to be arranged to be substantially parallel to the first direction when the flexible display panel is withdrawn from the housing.

5. The flexible display of claim 4, wherein the first and second fixing members are configured to be housed in the housing, wherein the first rotating member is arranged at a first side of an inner surface of the housing, wherein the second rotating member is arranged at a second side of the inner surface of the housing opposing the first side in the second direction, wherein a second end of the first fixing member opposing the first end is arranged adjacent to the second rotating member when the flexible display panel is accommodated in the housing, and wherein a second end of the second fixing member opposing the first end is arranged adjacent to the first rotating member when the flexible display panel is accommodated in the housing.

6. The flexible display of claim 5, wherein the first fixing member is configured to rotate in a clockwise direction and the second fixing member is configured to rotate in a counter-clockwise direction when the flexible display panel is withdrawn from the housing.

7. The flexible display of claim 5, wherein the housing comprises an opening defined in the surface thereof, and wherein the flexible display panel, the first fixing member, and the second fixing member are configured to be accommodated in and withdrawn from the housing through the opening.

8. The flexible display of claim 7,
   wherein the first fixing member is configured to be engaged with a first recess, and
   wherein the second fixing member is configured to be engaged with a second recess.

9. The flexible display of claim 7, wherein the opening comprises:
   a first opening through which the flexible display panel is configured to be retracted into and withdrawn from the housing; and
   a second opening through which the first and second fixing members are configured to be retracted into and withdrawn from the housing.

10. The flexible display of claim 7, wherein the first fixing member is arranged above the second fixing member.

11. The flexible display of claim 7, wherein the first and second fixing members are arranged in substantially the same horizontal plane, wherein the second rotating member is arranged further from the opening than the first rotating member in the first direction, and wherein the length of the second fixing member is greater than the length of the first fixing member.

12. The flexible display of claim 4, wherein the housing comprises a first opening defined in the surface of the housing, wherein the grip comprises a sub-housing defined in the surface of the grip, wherein the first and second fixing members are configured to be housed in the sub-housing, wherein the flexible display panel is configured to be retracted into and withdrawn from the housing through the first opening, and wherein the first and second fixing members are configured to be retracted into and withdrawn from the grip through a second opening defined in the sub-housing.

13. The flexible display of claim 12, wherein the first rotating member is arranged at a first side of an inner surface of the grip, wherein the second rotating member is arranged at a second side of the inner surface of the grip opposing the first side in the second direction, wherein a second end of the first fixing member opposing the first end is arranged adjacent to the second rotating member, and wherein a second end of the second fixing member opposing the first end is arranged adjacent to the first rotating member.

14. The flexible display of claim 13, wherein the first fixing member is arranged above the second fixing member in the grip so as to be substantially parallel to the second direction when the flexible display is accommodated in the housing.

15. The flexible display of claim 14, wherein the second opening in the sub-housing comprises:
 a third opening through which the first fixing member is configured to be retracted into and withdrawn from the grip; and
 a fourth opening arranged under the third opening and through which the second fixing member is configured to be retracted into and withdrawn from the grip.

16. The flexible display of claim 13, wherein the first and second fixing members are arranged in substantially the same horizontal plane surface, wherein the second rotating member is arranged further from the sub-housing than the first rotating member in the first direction, and wherein the length the second fixing member is greater than the length of the first fixing member.

17. The flexible display of claim 4, wherein the fixing members further comprise:
 third and fourth fixing members each having a substantially bar shape; and
 third and fourth rotating members each being respectively connected to first ends of the third and fourth fixing members,
 wherein the first and second fixing members and the first and second rotating members are configured to be accommodated in the housing,
 wherein the third and fourth fixing members and the third and fourth rotating members are configured to be accommodated in the grip part,
 wherein each of the third and fourth fixing members is configured to respectively rotate with respect to the third and fourth rotating members, and
 wherein the third and fourth fixing members are configured to be arranged substantially parallel to the first direction when the flexible display is withdrawn from the housing.

18. The flexible display of claim 17, wherein the housing comprises a first opening defined in the surface of the housing, wherein the grip comprises a second opening defined in the surface of the grip, wherein the first and second fixing members are configured to be retracted into and withdrawn from the housing through the first opening, and wherein the third and fourth fixing members are configured to be retracted into and withdrawn from the grip through the second opening.

19. The flexible display of claim 18, wherein the first rotating member is arranged at a first side of the housing, wherein the second rotating member is arranged at a second side of the housing opposing the first side in the second direction, wherein the third rotating member is arranged at a first side of the grip, and wherein the fourth rotating member is arranged at a second side of the grip opposing the first side in the second direction.

20. The flexible display of claim 19, wherein a second end of the first fixing member opposing the first end is configured to rotate in the clockwise direction, wherein a second end of the third fixing member opposing the first end is configured to rotate in the counter-clockwise direction, wherein the second end of the first fixing member is configured to contact the second end of the third fixing member, wherein the first and third fixing members are configured to connect to each other such that a longitudinal direction of each of the first and third fixing members is arranged in the first direction, wherein a second end of the second fixing member opposing the first end is configured to rotate in the counter-clockwise direction, wherein a second end of the fourth fixing member opposing the first end is configured to rotate in the clockwise direction, wherein the second end of the second fixing member is configured to contact the second end of the fourth fixing member, and wherein the second and fourth fixing members are configured to connect to each other such that a longitudinal direction of the second and fourth fixing members is arranged in the first direction.

\* \* \* \* \*